United States Patent
Rong et al.

(10) Patent No.: US 6,879,946 B2
(45) Date of Patent: Apr. 12, 2005

(54) INTELLIGENT MODELING, TRANSFORMATION AND MANIPULATION SYSTEM

(75) Inventors: Li Rong, Waterloo (CA); Andrew K. C. Wong, Waterloo (CA)

(73) Assignee: Pattern Discovery Software Systems Ltd., Waterloo (CA)

( * ) Notice: Subject to any disclaimer, the term of this patent is extended or adjusted under 35 U.S.C. 154(b) by 817 days.

(21) Appl. No.: 09/725,929

(22) Filed: Nov. 30, 2000

(65) Prior Publication Data

US 2002/0095276 A1 Jul. 18, 2002

Related U.S. Application Data

(60) Provisional application No. 60/168,020, filed on Nov. 30, 1999.

(51) Int. Cl.[7] .............................................. G06F 17/10
(52) U.S. Cl. ........................... 703/2; 345/419; 345/420; 700/98
(58) Field of Search .............................. 703/2; 345/414, 345/427, 420; 382/154; 700/98

(56) References Cited

U.S. PATENT DOCUMENTS

| | | | | |
|---|---|---|---|---|
| 5,268,998 A | * | 12/1993 | Simpson | 345/427 |
| 5,712,793 A | * | 1/1998 | Scepanovic et al. | 716/12 |
| 6,249,600 B1 | * | 6/2001 | Reed et al. | 382/154 |
| 6,373,484 B1 | * | 4/2002 | Orell et al. | 345/420 |

* cited by examiner

*Primary Examiner*—Albert W. Paladini
(74) *Attorney, Agent, or Firm*—Lynn C. Schumacher; Hill & Schumacher

(57) ABSTRACT

The present invention relates to a method of intelligent 2D and 3D object and scene modeling, transformation and manipulation and more particularly this invention relates to the field of computer modeling, virtual reality, animation and 3D Web streaming. The method uses attributed hypergraph representations (AHR) for modeling, transforming and manipulating objects. From one or more 2D views of a 3D object or scene, range information is first computed and then a triangular mesh model is constructed. The data structure is designed to handle the transformations on the representation corresponding to movements and deformations of the object. In an attributed hypergraph, the attributes associated with the hyperedges and the vertices facilitates modeling of various shapes with geometrical, physical or behavior features. As a hierarchical and generic representation, AHR enables pattern matching, recognition, synthesis and manipulation to be carried out at different resolution levels on different subsets depending on the context. Symbolic computation on knowledge represented in the format of attributed hypergraphs becomes straightforward. Given the features of a 3D object or scene, the procedure of constructing the AHR corresponds to the concept of functor in category theory, which maps one category to another one. The transformations of AHR are in the form of a set of operations defined on attributed hypergraphs, which stand for the motions and deformations of the object. This representation is applied to various modeling and manipulation tasks on 3D objects. The process of motion analysis of a 3D object is the task of extracting a sequence of AH operators from the AHR of the object. A 3D scene can be modeled by AHR and then altered/augmented with other 3D models, by which an augmented reality can be built. Given the AHR's of two different 3D shapes, 3D morphing may be accomplished by matching the two AHR's and then mapping the difference to a sequence of AH operators. Model based animation of an object can be accomplished by applying a set of AH operators to its AHR. The AHR method forms a data compression system for efficient web streaming over the Internet.

30 Claims, 10 Drawing Sheets

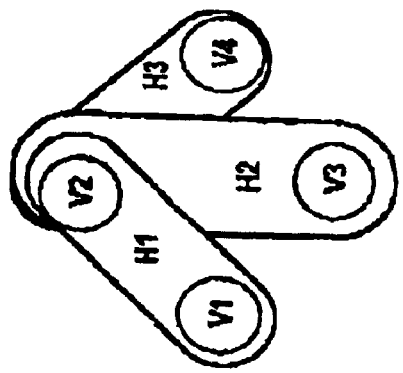
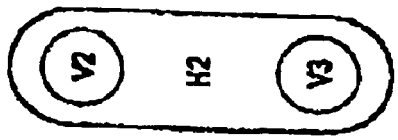
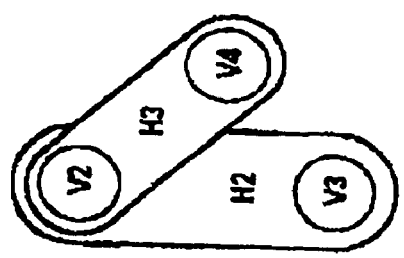
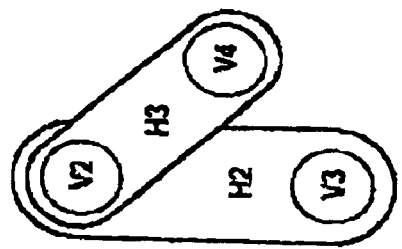
FIG. 5a          FIG. 5b
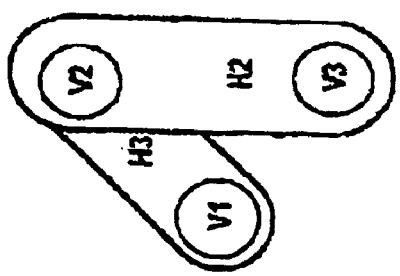
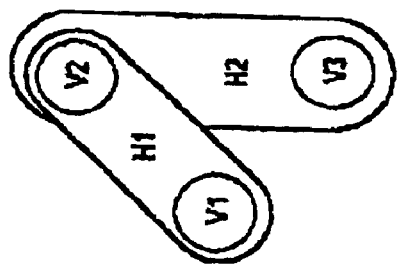

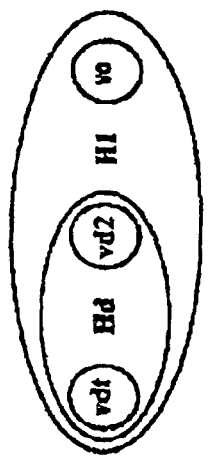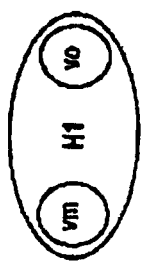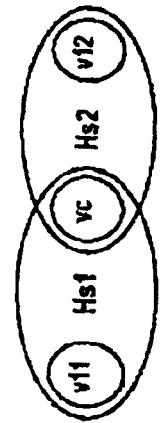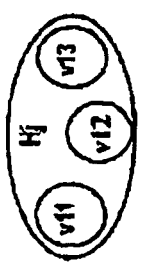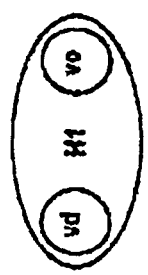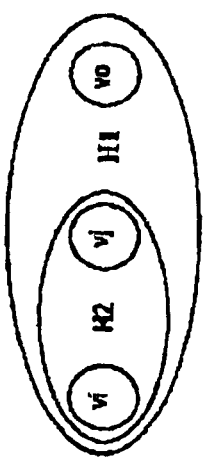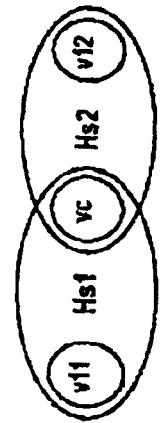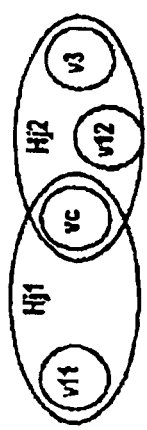
FIG. 6(a)　FIG. 6(b)　FIG. 6(c)　FIG. 6(d)　FIG. 6(e)

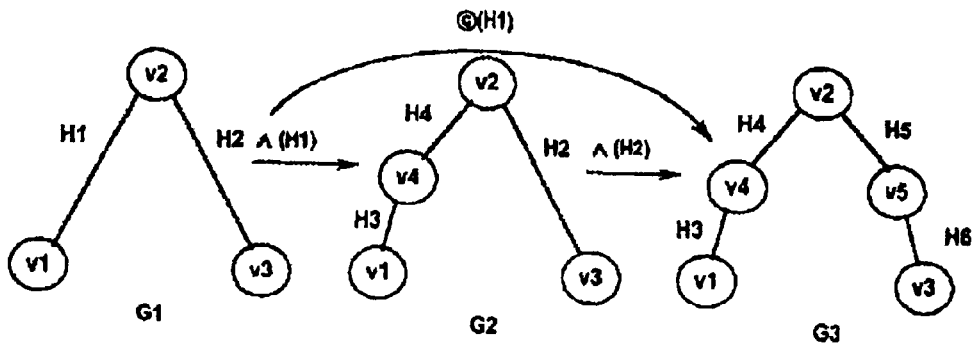
FIG. 8
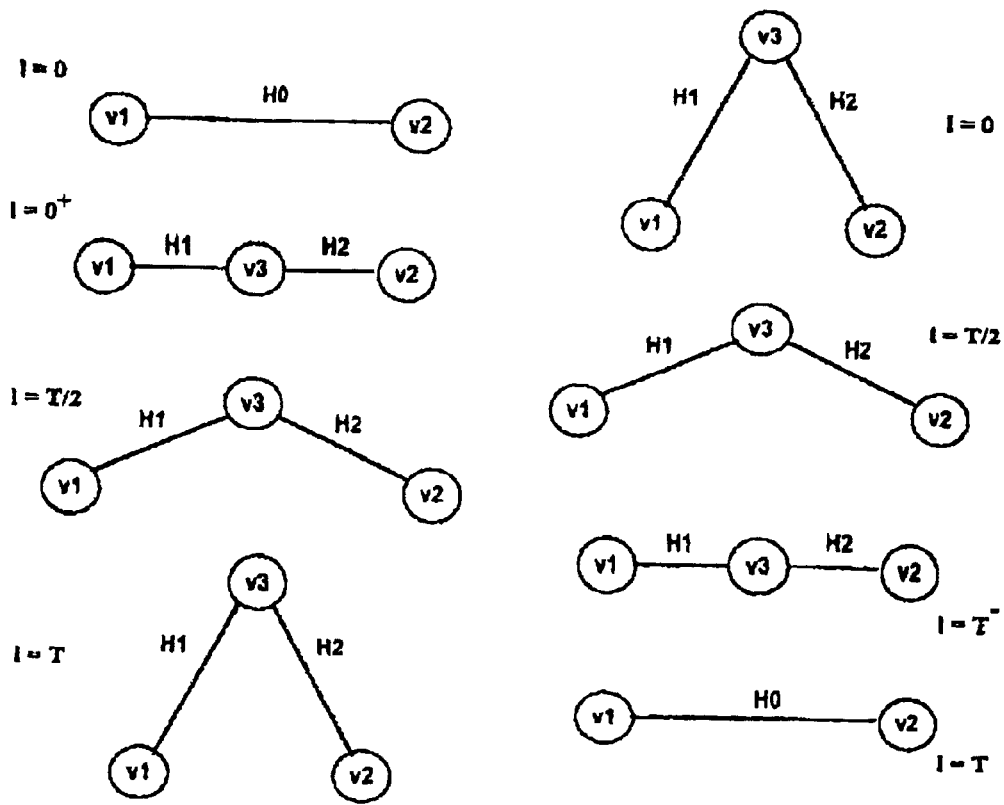
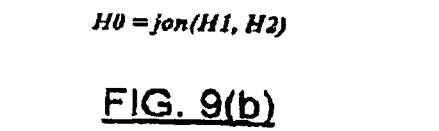
FIG. 9(a)          FIG. 9(b)

INTELLIGENT MODELING, TRANSFORMATION AND MANIPULATION SYSTEM

CROSS REFERENCE TO RELATED UNITED STATES PATENT APPLICATION

This patent application is related to U.S. provisional patent application Ser. No. 60/168,020 filed on Nov. 30, 1999 entitled INTELLIGENT MODELING, TRANSFORMATION AND MANIPULATION (IMTM) SYSTEM.

FIELD OF THE INVENTION

The present invention relates to a method of intelligent 2D and 3D object and scene modeling, transformation and manipulation and more particularly this invention relates to the field of computer modeling, virtual reality, animation and 3D Web streaming.

BACKGROUND OF THE INVENTION

Studies of the human vision system show that the analysis of dynamic scene involves both low-level processing at the retina and high-level knowledge processing in the brain, see P. Buser and M. Imbert, *Vision*, translated by R. H. Kay, pp. 137–151, The MIT Press, 1992, Su-Shing Chen, Structure form Motion without the Rigidity Assumption, *Proceedings of the 3rd Workshop on Computer*. For motion analysis, it has been shown that the human vision system captures both high-level structures and low-level motions of a dynamic scene, see D. Burr and J. Ross, Visual Analysis during Motion, *Vision, Brian, and Cooperative Computation*, pp. 187–207, edited by M. A. Arbib and A. R. Hanson, The MIT Press, 1987. Unfortunately, current vision and graphics systems do not satisfy this requirement. Popular representations such as those taught by M. Kass, A. Witkin and D. Terzopoulos, Snakes: Active Contour Models, *International Journal of Computer Vision*, pp.321–331, Kluwer Academic Publishers, Boston, 1988, and D. N. Lee, The Optical Flow Field: The Foundation of Vision, *Philosophical Transactions of the Royal Society of London*, B290, pp 169–179, 1980, do not enable symbolic or knowledge manipulation. These systems generally lack the capability of automated learning unknown types of motion and movements of modeled objects.

In the fast growing virtual reality society, realistic visual modeling for virtual objects has never been so eagerly needed in its history. Previous modeling techniques mainly look after geometrical appearance or physical features. However, as pointed out in J. Bates, Deep Structure for Virtual Reality, Technical Report, CMU-CS-91-133, Carnegie Mellon University, May, 1991, and G. Burdea and P. Coiffet, *Virtual Reality Technology*, John Wiley and Sons, Inc., 1994, an ideal object modeling has at least the following requirements: appearance modeling for geometric shapes; kinematics modeling for the rotations and translations of objects; physical modeling of various properties such as the mass, inertia, deformation factors of objects to mention just a few; and behavioral features such as intelligence and emotions.

Similar requirements arise from many Internet applications where there is a fast growing interest in 3D Web contents. Current 3D Web methodologies (such as VRML, see D. Brutzman, M. Pesce, G. Bell, A. Dam and S. Abiezzi, VRML, Prelude and Future, *ACM SIGGRAPH '96*. pp. 489–490, New Orleans, August 1996) heavily depend on Internet bandwidth to transmit 3D data. Therefore, an efficient 3D representation is required to "compress" the complex and multi-aspect 3D data.

To satisfy all these requirements, there is needed a generic structure to enable symbolic operations for the modeling and manipulation of real and virtual world data with different types of information. The representation of visual object has preoccupied computer vision and graphics researches for several decades. Before the emergence of computer animation, research mainly focused on the modeling of rigid shapes. Despite the large body of work, most techniques lacked the flexibility to model non-rigid motions. Only after the mid 1980's were a few modeling methodologies for solving deformation problems.

An effective object modeling methodology should characterize the object's features under different circumstances in the application scope. In the early research, focus was placed on appearance modeling since the objects involved in vision and graphics applications were mostly simple and stationary. Currently, simple unilateral modeling can no longer satisfy the requirement in dynamic vision and computer animation. As discussed in G. Burdea and P. Coiffet, *Virtual Reality Technology*, John Wiley and Sons, Inc., 1994, a complete 3D object modeling should ideally comprise at least the following components.

1) Geometrical modeling: this is the basic requirement for any vision or graphics system. It describes an object's geometrical properties, namely, the shape (e.g., polygon, triangle or vertex, etc.) and the appearance (e.g., texture, surface reflection and/or color).

2) Kinematics modeling: this specifies an object's motion behaviors that are vital for dynamic vision and animation. 4×4 or 3×4 homogeneous transformation matrices can be used to identify translations, rotations and scaling factors.

3) Physical modeling: physical modeling is required for complex situations where the object is elastic and/or deformations and collisions are involved. Objects can be modeled physically by specifying their mass, weight, inertia, compliance, deformation parameters, etc. These features are integrated with the geometrical modeling along with certain physical laws to form a realistic model.

4) Behavior modeling: this is the least studied aspect of modeling. In intelligent modeling, an object can be considered as an intelligent agent that has a degree of intelligence. It can actively respond to its environments based on its behavioral rules.

Hereinafter, current modeling methodologies are reviewed and classified into three categories: continuous modeling, discrete modeling and graph-based modeling.

Continuous Modeling

This type of modeling approximates either the whole or a functional part of the 3D object by a variation of geometrical primitives, such as blocks, polyhedrons, spheres, generalized cylinders or superquadrics. These geometrical primitives can be expressed as continuous or piecewise continuous functions in 3D space. Kinematic and physical features can be easily combined with the geometrical shapes. Among the large body of the geometrical primitives, generalized cylinders and superquadrics are the popular ones since they could easily handle deformations. Barr is considered as one of the first to borrow the techniques from linear mechanical analysis to approximate visual 3D objects, see A. Barr, Superquadrics and Angle-preserving Transformations, *IEEE Computer Graphics Applications*, 18:21–30, 1981, and A. Barr and A. Witkin, Topics in Physically Based Modeling, *ACM SIGGRAPH '89*, Course Note 30, New York, 1989. He defined the angle-preserving transformations on superquadrics. Although the original approach is only for computer graphics, it is also useful in vision tasks with fruitful results. As a dynamic extension of superquadrics, the deformable superquadrics proposed by D. Terzopoulos and D. Metaxas, Dynamic 3D models with local and global deformations: Deformable Superquadrics, *IEEE Transactions on PAMI*, 13(7):703–714, 1991, is a physical feature-based approach. It fits complex 3D shapes with a class of dynamic models that can deform both globally and locally. The model incorporates the global shape parameters of a conventional superellipsoid with the local degrees of freedom of a spline. The local/global representation simultaneously satisfies the requirements of 3D shape reconstruction and 3D recognition. In animation, the behaviors of the deformable superquadrics are governed by motion equations based on physics. In 3D model construction, the model is fitted with 3D visual information by transforming the data into forces and simulating the motion equations through time.

In animation tasks, it is easy to detect, attach and apply geometrical, kinematic and physical parameters to continuously modeled objects. However, it is difficult for behavioral features since the model lacks a symbolic structure as the base to fit in behavioral languages. Furthermore, to form any real world objects, approximation by those pre-defined primitives such as generalized cylinders or superquadrics is impossible.

Discrete Modeling

A wide variety of computer vision applications involve highly irregular, unstructured and dynamic scenes. They are characterized by rapid and non-uniform variations in spatially irregular feature density and physical properties. It is difficult to model such objects from any of the four aspects mentioned before with continuous elements. Such difficulty arises from the unpredictable behaviors of the objects. Discrete modeling is able to approximate the surfaces or volumes of this kind of objects by vast patches of very simple primitives, such as polygons or tetrahedrons.

Since most graphics applications use polygons as the fundamental building block for object description, a polygonal mesh representation of curved surfaces is a natural choice for surface modeling as disclosed in G. Turk, Re-Tiling Polygonal Surfaces, *Computer Graphics* (*SIGGRAPH '92*), 26(2):55–64, 1992. Polygonal approximation of sensory data is relatively simple and sampled surfaces can be approximated to the desired precision, see M. A. Khan and J. M. Vance, A Mesh Reduction Approach to Parametric Surface Polygonization, 1995 *ASME Design Automation Conference Proceedings*, Boston, Mass., September 1995. Physical and kinematic features can be associated more flexibly with either a single element (a polygon) or a group of elements (a patch of polygons).

Triangular mesh is a special case of polygonal mesh. It has been recognized as a powerful tool for surface modeling due to its simplicity and flexibility and abundance of manipulation algorithms. They are used in many general vision and graphics applications, which provide fast preprocessing, data abstraction and mesh refinement techniques, see see for example R. E. Fayek, *3D Surface Modeling Using Topographic Hierarchical Triangular Meshes*, Ph.D Thesis, Systems Design Eng., University of Waterloo, Waterloo, Ontario, Canada, April 1996, L. De Floriani and E. Puppo, Constrained Delaunay Triangulation for Multi-resolution Surface Description, *Pattern Recognition*, pp. 566–569, 1988, and S. Rippa, Adaptive Approximation by Piecewise Linear Polynomials on Triangulations of Subsets of Scattered Data, *SIAM Journal on Scientific and Statistical Computing*, pp. 1123–1141, 1992. Based on the triangular mesh, Terzopoulos and Waters had successfully attached physical constraints on the human facial model as disclosed in D. Terzopoulos and K. Waters, Analysis and Synthesis of Facial Image Sequences Using Physical and Anatomical Models, *IEEE Transactions on PAMI*, 15(6):569–579, 1993. From sequences of facial images, they built mesh models with anatomical constraints. An impressive advance of the methodology is that it has the capability to model the behavioral features. With the support of anatomical data, different emotions can be modeled and applied to arbitrary human faces.

The main drawback of discrete methodologies is that it lacks the high level structure to control the modeling or to perform symbolic operations. Furthermore, the discrete primitives are unstructured and only contain information about local features. When applied to dynamical cases, even though the geometrical modeling can be highly precise, abstracting high level information from the data is still problematic.

Graph-Based Symbolic Modeling

In graph-based approaches, a complex object is usually represented explicitly by a set of primitives and the relations among them in the form of a graph. If the primitives are regular blocks such as cylinders, cubes or superquadrics, such model can be viewed as a clone of continuous modeling. If the model consists of vast number of primitives that are discrete polygons or polygonal meshes, it is an extension of discrete model.

The graph representation was first put forward in 1970 neither for computer vision nor for graphics applications, but for the script description of a scene in artificial intelligence, see A. C. Shaw, Parsing of Graph-Representation Pictures, *Journal of ACM*, 17:453–481, 1970. In the early 1980's, Shapiro (L. G. Shapiro, Matching Three-dimensional Objects using a Relational Paradigm, *Pattern Recognition*, 17(4):385405, 1984) applied relational graphs for object representation where the quadtree (for surface) and octree (for solid) encoding algorithm given by Meagher (D. J. Meagher, Octree encoding: a new technique for the representation, manipulation, and display of arbitrary three-dimensional objects by computer, *Technical Report*, IPL-TR-80, 111, Image Processing Laboratory, Rensselaer Polytechnic Institute, Troy, N.Y., Apr. 1982). It can be viewed as a special case since they form trees (directed graphs) as the hierarchical structure for representation. In the same period, Wong et al. introduced the attributed hypergraph representation for 3D objects see A. K. C. Wong and S. W. Lu, Representation of 3D Objects by Attributed Hypergraph for Computer Vision, Proceedings of *IEEE S.M.C International Conference*, pp.49–53, 1983. Later, random graph (A. K. C. Wong and M. You, Entropy and Distance of Random Graphs with Applications to Structural Pattern Recognition, *IEEE Transactions on PAMI*, 7(5) :599–609, 1985) and more sophisticated attributed hypergraphs are presented as geometry and knowledge representation for general computer vision tasks (A. K. C. Wong and R. Salay, An Algorithm for Constellation Matching, *Proceedings on of 8th International Conf. on Pattern Recognition*, pp.546–554, Oct. 1986 and A. K. C. Wong, M. Rioux and S. W. Lu, Recognition and Shape Synthesis of 3-D Objects Based on Attributed Hypergraphs, *IEEE Transactions on PAMI*, 11(3):279–290, 1989.

In 3D model synthesis, random graphs were applied to describe the uncertainties brought by sensors and image processing, see A. K. C. Wong and B. A, McArthur, Random Graph Representation for 3-D Object Models, *SPIE Milestone Series*, MS72:229–238, edited by H. Nasr, in Model-Based Vision, 1991. In Wong et al., an attributed hypergraph model was constructed based on model features (A. K. C.

Wong and W. Liu, Hypergraph Representation for 3D Object Model Synthesis and Scene Interpretation, *Proceedings on 2nd Workshop on Sensor Fusion and Environment Modeling (ICAR)*, Oxford, U.K., 1991). The representation had a four-level hierarchy that characterizes: a) the geometrical model features; b) the characteristic views induced by local image/model features, each of which contains a subset of the model features visible from a common viewpoint; c) a set of topological equivalent classes of the characteristic views; and d) a set of local image features wherein domain knowledge could be incorporated into the representation for various forms of decision making and reasoning.

Since graph-based modeling approaches introduce the concepts of primitives and their relations, it is straightforward for constructing a hierarchical representation. At lower levels, geometrical, kinematic and physical features can be encoded as the primitives and their associated attributes. At higher levels, entities such as edges and hyperedges can be used to represent symbolic information. In a graph structure, it is handy to perform symbolic operations. With the aid of machine intelligence, domain knowledge can be learned and later recalled and processed together with other data. However, traditional graph-based methods lack the representational power for dynamic objects. Although they have the potential to handle deformations/transformations, yet up to now, they are applied only to rigid object modeling, due to their rigid structure and the lack of transformation operators on graphs.

The fast paced developments in computer vision, computer graphics and Internet motivate the need for a new modeling methodology using a unified data structure and manipulation processes directed by machine intelligence.

SUMMARY OF THE INVENTION

An object of the present invention is to provide a generic and unified object modeling for computer vision, computer graphics, animation and 3D Internet using machine intelligence.

In one aspect of the invention there is provided a computerized method of modeling a three dimensional object, comprising:

extracting selected topological features from captured imaging data or other surface data of a three dimensional object;

constructing a triangular mesh representation of said three dimensional object from said topological features;

mapping vertices and edges of said triangular mesh to vertices and edges respectively of a representative attributed graph; and constructing an attributed hypergraph representation from said representative attributed graphs.

In another aspect of the invention there is provided a computerized method of intelligent model transformation, comprising the steps of:

computing an optimal subgraph isomorphism for attributed hypergraph between a source attributed hypergraph and a target attributed hypergraph, wherein said source attributed hypergraph is to be transformed into said target attributed hypergraph;

computing a sequence of transformation operators from said optimal subgraph isomorphism for attributed hypergraph;

computing a transformation path from said sequence of transformation operators; and generating a sequence of attributed hypergraphs along said transformation path from said sequence of transformation operators.

In another aspect of the invention there is provided a computerized method of intelligent model augmentation of a real scene with a virtual scene into an augmented scene, comprising the steps of:

constructing an attributed hypergraph representation of said real scene;

constructing an attributed hypergraph representation of said virtual scene;

computing a sequence of transformation operators between said two attributed hypergraphs;

integrating said two attributed hypergraph representations into a unified attributed hypergraph representation using said sequence of transformation operators;

constructing an augmented scene from said unified attributed hypergraph representation.

BRIEF DESCRIPTION OF THE DRAWINGS

The invention will now be described, by way of example only, reference being had to the accompanying drawings in which;

FIG. 5 shows the primary operators for attributed hypergraphs: 5(*a*) union and 5(*b*) intersection;

FIG. 6 shows the primary operators for an attributed hypergraph: (a) dichotomy; (b) merge; (c) subdivision; (d) join; (e) attribute transition.

FIG. 8 graphically illustrates a compound operator defined on a simple graph;

FIG. 9 illustrates examples of continuous transformations with qualitative transition operators on simple graphs: (a) subdivision and (b) join;

DETAILED DESCRIPTION OF THE INVENTION

Figure 1:
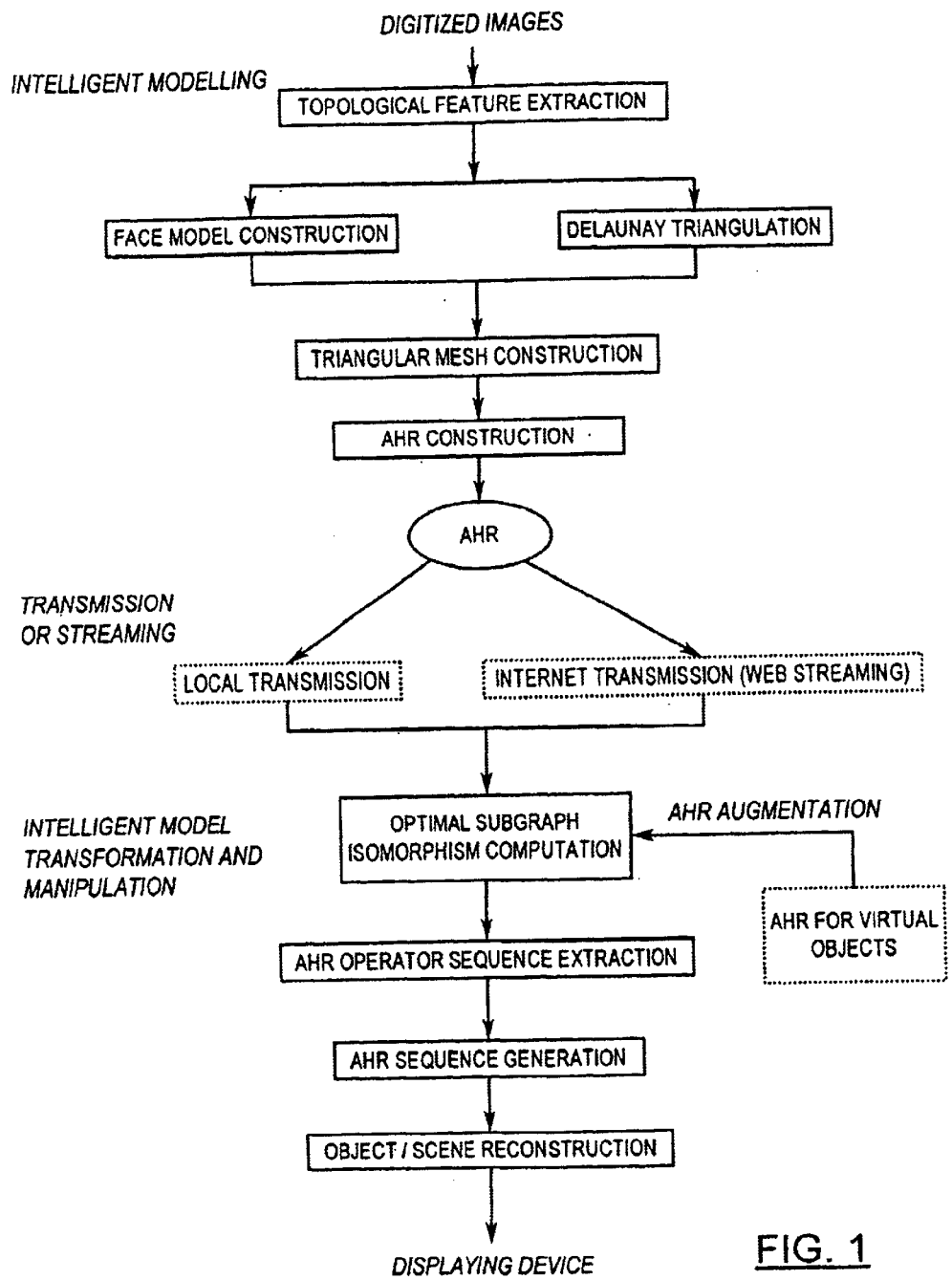
FIG. 1 is a block diagram of an integrated computer vision and graphics system using the intelligent modeling, transformation and manipulation method according to the present invention.

The present invention provides a new form of attributed hypergraph representation (AHR), which when coupled with triangular mesh surface approximation, provides a highly efficient method for both 2D and 3D modeling. For 3D objects, surface modeling is preferred to solid modeling since it fits both computer vision and computer graphics applications as common vision sensors provide surface data only. A net-like data structure is designed to handle the dynamic changes of the representation corresponding to the object's movements and deformations so as to overcome the inflexibility of graph structure. FIG. 1 gives a block diagram of the integrated intelligent modeling, transformation and manipulation system based on AHR.

For any scientific study on the representation, in particular, for general object modeling, the fundamental problem is; given a collection of instances of a certain entity, a set of transformations that can be applied on the entity, and an isomorphism or equivalent relation with respect to the transformations, find the general description of the entity and the associated transformations in a mathematical language. In this invention, categorical formalism is brought upon to generalize the above problem, since it provides a mathematical language to address objects, transformations, invariance and equivalence which is essential for a general pattern representation and manipulation.

The universality of the categorical language enables formal definitions of notions and procedures which, in the past, were empirically defined in the computer vision and computer graphics settings. Many concepts in category theory can play predominant roles in the formalization of most general representation problems. It also helps to establish links between apparently very different notions (such as projections and transformations), or between different aspects of a same problem (such as geometrical modeling and physical modeling).

I. Definitions and Notations

[Definition 1] A category C is given if a class of elements, called objects, are given such that:
1. for each pair of objects (O1, O2) in C, a map u, called a morphism (denoted as $$O1 \xrightarrow{u} O2)$$

is given;
2. for each object O in C, there is an identity morphism $l_o$, such that, if $$O \xrightarrow{l_o} O',$$

then O'=O;
3. the composition (denoted as *) maps of morphisms satisfy the following axioms:
1) if $$O1 \xrightarrow{u} O2 \xrightarrow{v} O3 \xrightarrow{w} O4, \text{ then } O1 \xrightarrow{v*u}$$
$$O3 \xrightarrow{w} O4 \text{ and } O1 \xrightarrow{u} O2 \xrightarrow{w*v} O4$$

2) identity maps always compose with $$O \xrightarrow{u} O'$$

to give $l_{o'} * u = u$ and $u * l_o = u$.

The categories commonly met in mathematics have objects that are structured sets and morphisms.

[Definition 2] A morphism u from O to O', denoted as $$O \xrightarrow{u} O',$$

is called a retraction if there exists a morphism v from O' to O, such that $$O' \xrightarrow{v} O$$

and u*v=lo'. A morphism u from O to O' Is called a coretraction, if there exists a morphism v from O' to O such that $$O' \xrightarrow{v} O$$

and v*u=lo. A morphism u is an isomorphism, if it is both a retraction and a coretraction, and then O is said to be isomorphic to O', denoted as O~O'. If O~O' and O'~O" then O~O".

[Definition 3] A covariant functor F from category C1 to category C2 is defined as a pair of maps F=(Fobj, Fmor):

objects of $$C1 \xrightarrow{Fobj}$$

objects of C2;
morphisms of $$C1 \xrightarrow{Fmor}$$

morphisms of C2.
or simply as $$C1 \xrightarrow{F} C2.$$

Usually we refer to a covariant functor simply as a functor.

Figure 3:
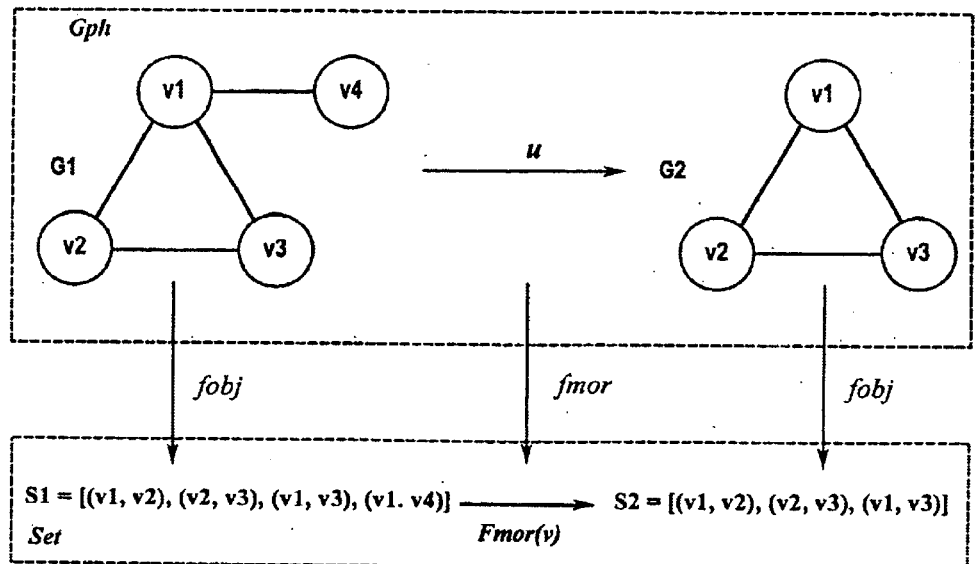
FIG. 3 graphically illustrates a functor $F=(F_{obj}, F_{mor})$ that maps category Gph to category Set.

FIG. 3 gives an example of a functor. G1 and G2 are two objects in category Gph, and a morphism u is defined such that $$G1 \xrightarrow{u} G2.$$

A covariant functor F=(Fobj, Fmor) is defined as the mapping from graph (Gph) to set (Set). We have $$G1 \xrightarrow{Fobj} S1 \text{ and } G2 \xrightarrow{Fobj} S2.$$

Corresponding to u, the morphism between S1 and S2 is Fmor(u).

[Definition 4] If a functor F defined on categories C1 and C2 preserves all retractions (coretractions, isomorphisms) from C1 to C2, it is called a retraction preserving (coretraction preserving, isomorphism preserving) functor.

[Definition 5] The composition of two functors F1 on categories $$C1, C2 \ (C1 \xrightarrow{F1} C2)$$

and F2 on categories $$C2, C3 \ (C2 \xrightarrow{F2} C3)$$

is defined as the functor F2 *F1 on C1 and C3, such that $$C1 \xrightarrow{F2*F1} C3$$

[Definition 6] Two categories C1 and C2 are called equivalent if there exists two functors F1 and F2, such that $$C1 \xrightarrow{F1} C2 \text{ and } C2 \xrightarrow{F2} C3,$$

and the compositions of the two functors have the properties
1. $F2*F1=1_{C1}$;
2. $F1*F2=1_{C2}$.

Figure 2:
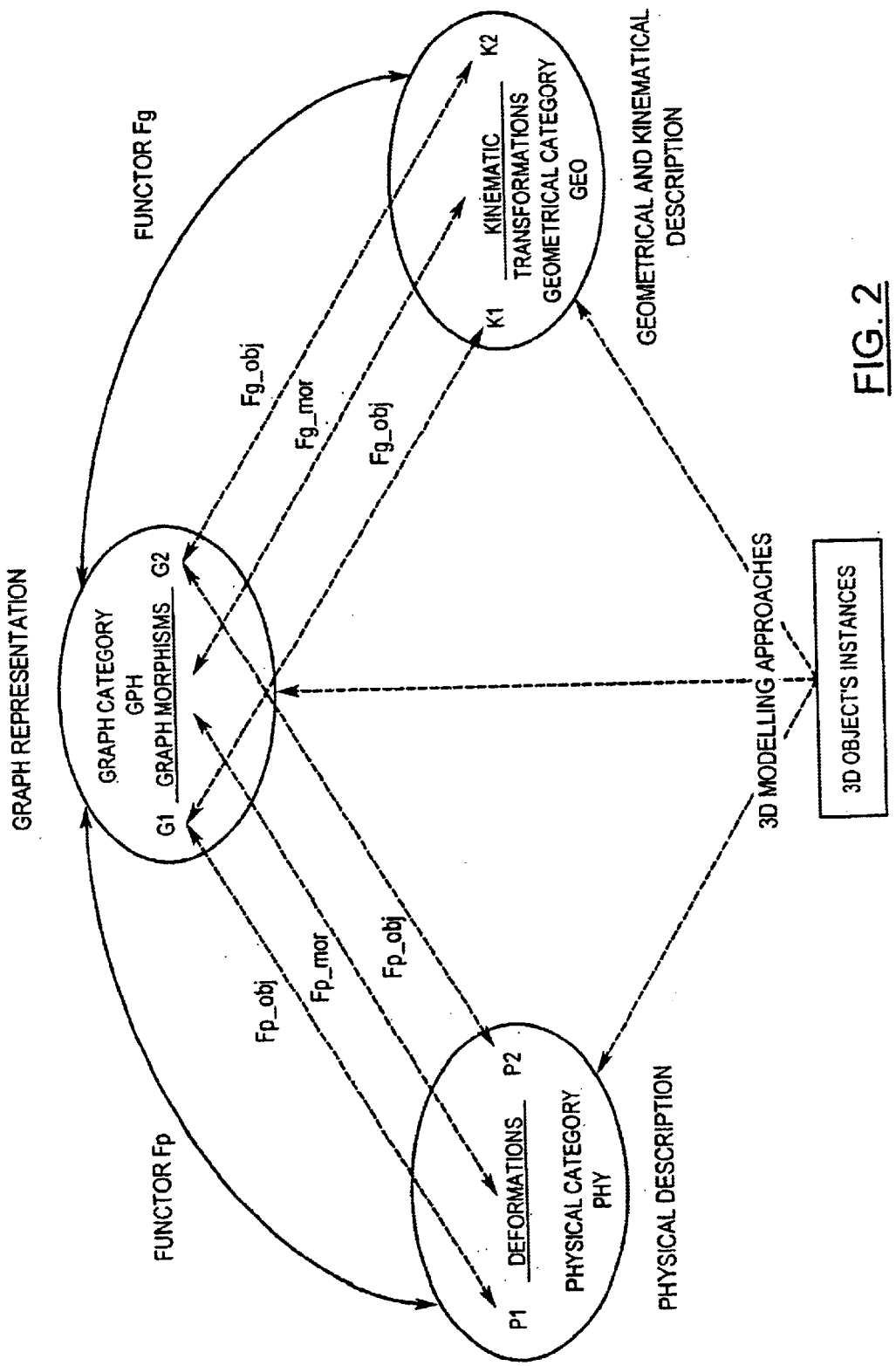
FIG. 2 shows the relationships among geometrical, physical and graph representations in the view of category theory.

With the concept of functor defined within the scope of computer vision and graphics applications, the geometrical, physical and graph representations can be viewed as different categories. In 3D case, their relations are shown in FIG. 2. The graph-based representation can be viewed as the result of structural abstractions from geometrical and physical representations, by applying the functors that map Geo and Phy to Gph respectively.

[Definition 7] A hypergraph is an ordered pair G=(X, Y), where X={vi|1≦i≦n} is a finite set of vertices and Y={ (H_j|1≦j≦m} is a finite set of hyperedges; each $H_j$ is a subset of X such that $H_1 \cup H_2 \cup \ldots \cup H_m = X$.

[Definition 8] An attributed hypergraph (AH) G is a hypergraph defined as an ordered pair G=(X, Y) associated with AX and AY, where G=(X, Y) is a hypergraph, AX is a finite set of vertex attribute values and AY is a finite set of hyperedge attribute values. vi in X may be assigned values of attribute from AX, and $H_j$ in Y may be assigned values of attribute from AY.

Figure 4:
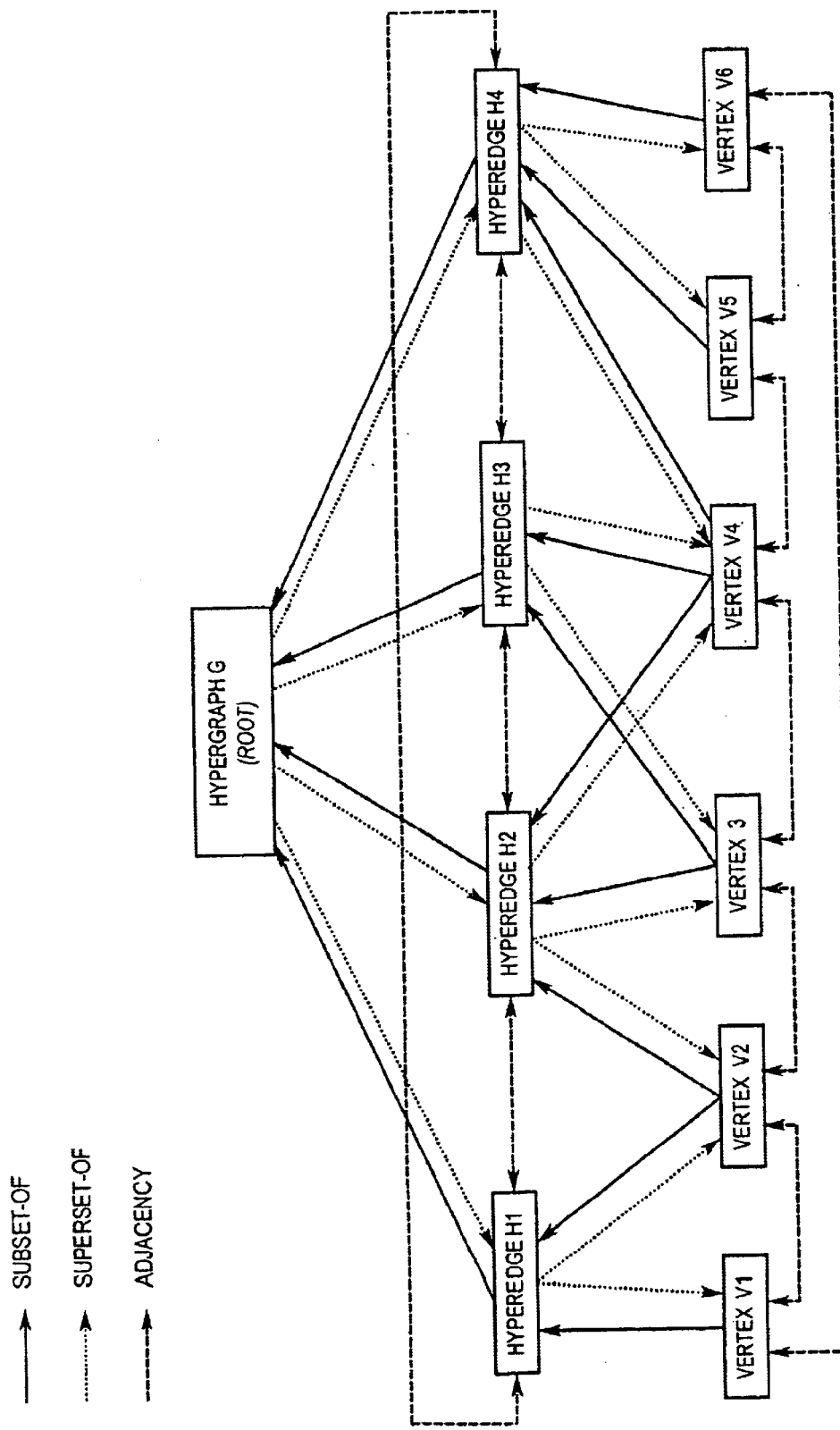
FIG. 4 shows the net-like structure for attributed hypergraph with nodes and links.

In the present invention, the hypergraph is implemented with a net-like dynamic data structure (an example in FIG. 4). The term "dynamic" signifies that the data structure supports structural operations such as join and subdivision on hypergraphs on the fly, which, in the view of category theory, are related to certain changes of the object via functors.

In a dynamic structured hypergraph, the basic element is called a node shown as a rectangle. The nodes at the bottom level represent the vertices; the nodes at the intermediate layers are the hyperedges which are supersets of the nodes at their lower levels; and the node at the top layer (called the root) represent the entire hypergraph.

With such a data structure, the structural changes on hypergraphs can be handled efficiently. For example, the join of two hyperedges is simply the combination of the two corresponding nodes and the re-organization of the associated links. Graph-based computations such as the re-organization of a hyperedge based on certain criteria can be performed by reshuffling the links between the nodes. However, in traditional hypergraph data representations such as the incidence matrix or adjacency matrix, any topological change could initiate a re-organization over many entities. Data elements with or without relations to the nodes to be operated on may have to be accessed.

In a hypergraph, information represented by nodes at higher layers is abstracted from those at lower layers. The nodes at higher layers are important for intelligent manipulation and knowledge processing, while those at lower layers are crucial for complete and accurate modeling. The nodes at the bottom layer construct an elementary graph.

[Definition 9] In a dynamic structured attributed hypergraph, the nodes at the bottom layer are called the elementary nodes, the links among the elementary nodes are called the elementary edges. The attributed graph, which consists of the elementary nodes and the elementary edges, is called the elementary graph.

If a hypergraph has n layers, and the node set at layer i is $X_i$, then hypergraph G=(X, Y) can be written in the form of $G=(X_1, X_2, \ldots, X_n)$ where $X=X_1$ and $Y=\{X_2, \ldots, X_n\}$. The meanings of the nodes at the hyperedge layers normally depend on the applications. In most applications, we prefer that there is a layer of hyperedges that characterizes the object's higher level properties. For example, in the task of environment modeling for indoor navigation, we can have the hyperedge layers on top of the elementary graph:

The elementary graph characterizes the basic features captured from the sensors such as corners and lines;

The hyperedges at the hyperedge layer extract the organization of the bottom nodes, representing higher level knowledge such as the layout of the furniture in a room or the organization of the rooms in a building;

The root node represents the entire scene.

The bottom layer of an attributed hypergraph should simultaneously satisfy the following two requirements:

The ability to represent subtle features for general patterns, from which one can reconstruct a complete object;

The suitability to integrate the representation into a structural framework.

The use of the mesh-based representation is ideal due to the unstructured nature of general 3D shapes. Compared with other mesh-based methodologies such as NURBS, the triangular mesh has the advantages that it is simple and flexible. In the vertex-edge structure, a triangular mesh can be written in the form of T=(Vt, Et) where Vt is the vertex set and Et is the edge set of the mesh.

[Definition 10] A representative attributed graph (RAG) G=(V, E) of a triangular mesh T is an attributed graph constructed in the following manner:

for each vertex vt∈Vt, there is a vertex va∈V corresponding to it, denoted as: vt→Va;

for each edge et∈Et, there is an edge ea∈E corresponding to it, denoted as: et→ea;

vt's features are mapped to va's features;

et's features are mapped to ea's features.

The AHR of a triangular mesh, which represents a 3D shape, is based on such a RAG. The elementary nodes of an attributed hypergraph (i.e., the nodes at the bottom level) consist of the vertices in the RAG, and the elementary edges are copied from the edges in the RAG. The properties of the surface attached to the triangular mesh, such as location, orientation, area, color, texture, mass density and elasticity, are mapped to the attributes associated with the vertices or edges. Thus, the RAG of the mesh directly constructs the elementary graph of the AHR.

[Definition 11] Suppose that X={x1, x2, ..., xn} is the vertex set of attributed hypergraph H=(X, Y), E={xe1, xe2, ..., xem} (E⊆X, ek<n; k=1, 2, ..., m), and ae1, ae2, ..., aem are the vertex attributes associating with vertices xe1, xe2, ..., xem respectively. We say that E is a hyperedge induced by attribute value a, if for a selected attribute value a, we have:

a $\in \{a_k | 1 \leq k \leq n\}$ if the corresponding vertex $x_k \in E$;
a $\notin \{a_k | 1 \leq k \leq n\}$ if the corresponding vertex $x_k \notin E$;
E, as a subgraph of H, is connected.

[Definition 12] The union of two hypergraphs $G_1=(X_1, Y_1)$ and $G_2=(X_2, Y_2)$, is to form a new hypergraph $G=(X, Y)$, denoted as $G=G1 \cup G2$, such that $X=X_1 \cup X_2$ and $Y=Y_1 \cup Y_2$.

[Definition 13] The intersection of two hypergraphs $G_1=(X_1, Y_1)$ and $G_2=(X_2, Y_2)$, is a new hypergraph $G=(X, Y)$, denoted as $G=G_1 \cap G_2$, such that $X=X_1 \cap X_2$ and $Y=Y_1 \cap Y_2$. FIG. 5(a) illustrates the operations of union, and FIG. 5(b) illustrates intersection on two simple hypergraphs.

[Definition 14] The dichotomy of a vertex $vd2 \in X$ in hypergraph $G=(X, Y)$, denoted as $(vd1 \Theta vd2)=vd$, can be obtained by the following steps:
1. in X, replace vd by two vertices vd1, vd2;
2. in Y, replace vd in all hyperedges by two vertices vd1, vd2; and
3. add a new hyperedge $H_d$ to Y where $H_d=\{vd1, vd2\}$.

An example of dichotomy is shown in FIG. 6(a).

[Definition 15] If in hypergraph $G=(X, Y)$, two vertices $vi \in X$ and $vj \in X$ are adjacent in n hyperedges $H_{j1}, H_{j2}, \ldots, H_{jn}$ in Y ($n \geq 1$), then the merge of vi and vj, denoted as $vm=vi \oplus vj$, can be obtained by the following steps:
1. in X, replace vi and vj by a single vertex vm;
2. in $H_{j1}, H_{j2}, \ldots ; H_{jn}$, replace vi and vj by a single vertex vm;
3. replace vi or vj by vm in any other hyperedges in Y;
4. if a hyperedge H contains only vi or vj, it is nullified.

An example of merge is shown in FIG. 6(b).

[Definition 16] The subdivision of hyperedge $H_s=\{vl1, vl2, \ldots, vln\}$ in hypergraph $G=(X, Y)$ (where $vli \in X$, i=1, 2, ..., n and $H \subseteq Y$), denoted as $(H_{s1}, H_{s2}, \ldots, H_{sn})=\wedge H_s$, can be obtained by the following steps:
1. add a new vertex ve to X;
2. add n hyperedges $H_{s1}, H_{s2}, \ldots, H_{sn}$ to Y. such that $H_{si}=\{vli, ve\}$ ($1 \leq i \leq n$);
3. nullify $H_s$.

FIG. 6(c) illustrates an example of subdivision on a simple hypergraph.

[Definition 17] If in hypergraph $G=(X, Y)$, $H_{j1} \in Y$ and $H_{j2} \in Y$ are two hyperedges with at least one common vertex, then the join of $H_{j1}$ and $H_{j2}$ in hypergraph $G=(X, Y)$, denoted as $H_j=H_{j1} \vee H_{j2}$, is to:
1. add a new hyperedge $H_j \in Y$ such that $H_j=H_{j1} \cup H_{j2}$;
2. nullify the common vertices of $H_{j1}$ and $H_{j2}$ in $H_j$;
3. nullify $H_{j1}$ and $H_{j2}$.

An example of join is shown in FIG. 6(d).

[Definition 18] The attribute transition of a hyperedge $H \in Y$ (or vertex $v \in X$) in an attributed hypergraph $G=(X, Y)$ denoted as $A'H=fa(AH)$ (or $A'v=fa(Av)$), is a mapping $$AH \xrightarrow{fa} A'H \text{ (or } Av \xrightarrow{fa} A'v)$$

which transforms the attribute value AH (or attribute value Av) without any change to H's connectivities (refer to FIG. 6(e)).

If op1 and op2 are two primary operators given in Definitions 12 to 18, the compound operator ⓒ of op1 and op2 is defined as applying op2 on the result of applying op1, denoted as ⓒ=op2*op1.

FIG. 8 shows an example. The compound operator ⓒ given by the figure can be written in the form of: $(H_3, H_7, H_6)=H_1 ⓒ H_2$. In most transformations on an AH, a qualitative change operator (union, intersection, dichotomy, merge, subdivision or join) is mostly associated with one or more quantitative change operators (attribute transition).

In the view of category theory, the primary operators and their compositions constitute the morphisms between different AH's in the AH category (Ahp). Through the mapping of functors, they correspond to the motions of the 3D patterns.

II. Detailed Description of the Methods of Model Construction, Transformation and Manipulation A. Intelligent 3D Model Construction FIG. 1 is a block diagram of an integrated computer vision and graphics system using the intelligent modeling, transformation and manipulation method according to the present invention. The steps in broken boxes are optional and are not directly essential for the method of modeling, transformation and manipulation. Of the optional steps, the entire process may be carried out on one computer, one or more local computers connected together or the internet may be used as a transmission medium for working the invention between server computers and client computers. This will be more fully discussed later.

The input data of this model construction algorithm can be from CGD cameras, laser range finders, radar ranger finders, sonar, or any other devices that generate images. All mentioned imaging devices produce images that typically contain thousands, if not hundreds of thousands of image pixels. It is neither practical nor productive to carry on object modeling directly at the pixel level. Thus, the first step of the model construction is to extract the topological features from captured imaging data of the three dimensional object shown in the image(s).

The feature extraction process applied in this patent is from the research result of Q Gao and A. K. C. Wong ("A Curve Detection Approach on Based on Perceptual Organization", *Pattern Recognition*, Vol 26, No. 7, pp. 1039–1046, August 1993), which is based on the relaxation edge-tracing method ("An Applications of Relaxation Labeling to Line and Curve Enhancement", S. W. Zuker, R. A. Hummel and A. Rosenfeld, *IEEE Transactions on Computers*, Vol 26, pp. 394–403, 1977). It has four steps: 1) feature detection, 2) feature segmentation; 3) feature classification; and 4) feature grouping. The first step of the method detects the salient features such as, for example, points, lines and contours from the pixel image, and the second steps finds the topological relations among them. In the case of using radar or laser range finders, these topological features already have the range information (the distance of the feature to the image projection plane). In the case of using conventional camera, to recover the range information, at least two cameras are required for each view. Then the range information can be calculated using the method given by T. S. Huang ("Determining Three-Dimensional Motion and Structure from Two Perspective Views", in *Handbook of Pattern Recognition and Image Processing*, Chapter 14, Academic Press, 1986) or by H. C. Longuet-Higgins ("A Computer Algorithm for Reconstructing a Scene from Two Projections", *Nature*, Vol 293, pp. 133–135, 1981).

The process to create the triangular meshes can be run directly on the extracted topological features. However, it is desirable to organize them into a geometrical model to represent the shape of the object first, which can simplify the process of triangular meshes generation, especially when the features extracted are sparse.

The most straightforward method to represent a shape is the use of wire-frames consisting of the surface discontinuity of the object. The two types of elements in a wire-frame model are lines and nodes. The lines correspond to the straight or curves, and the nodes are point features such as corners or points of abrupt curvature change. We consider the face modeling as a more generic dual of the wire-frame model. In a face model, the elements are the faces (surfaces) bounded by closed circuits of wire-frame edges. Using faces to model an object has several advantages over modeling with the wire-frames:

fewer faces than points/lines are required to describe the same object;

a face description enables information on the object, such as geometry, surface colors and textures to be attached to the model more easily;

a face can be bounded by any type of closed curves in addition to the wire-frame edges, making it straightforward to enclose any type of contours in the object.

Figure 11:
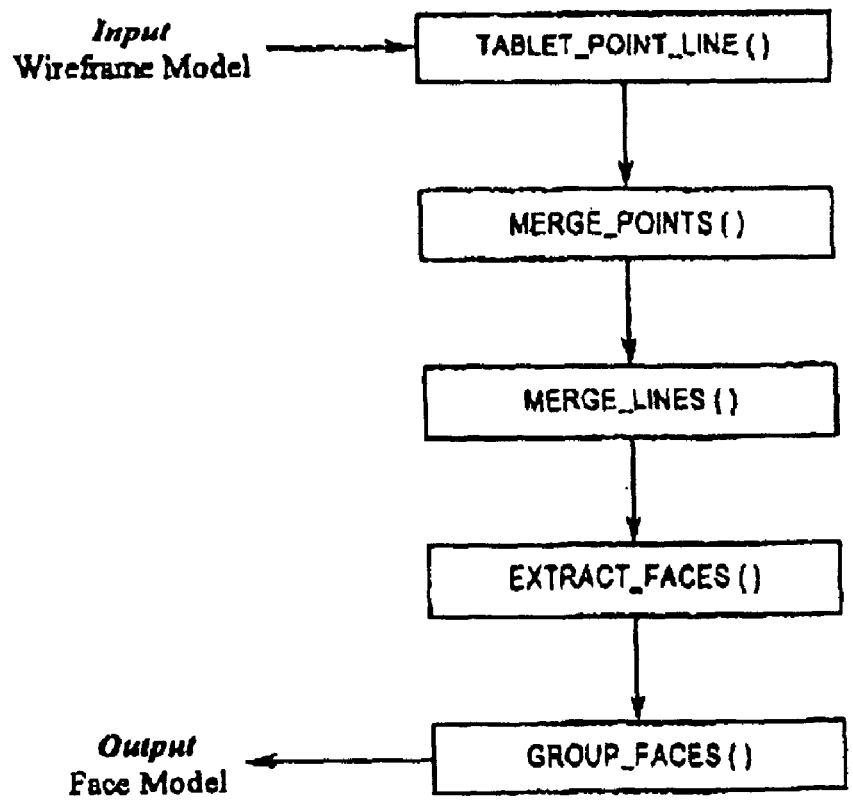
FIG. 11 shows the process to construct face representation from wire-frame model.

The procedure to extract faces is illustrated in FIG. 11. First, a procedure called Tablet_Point_Line( ) handles the points, lines and contours. An incidence table is generated as shown in Table 1, where $P_i$ (i=1, 2 . . . , k) are the point features, and $L_j$ (j=1, 2, . . . m) are the line or contour features. Empty columns, i.e., the lonely points, are considered as noise and are removed from the table.

TABLE 1

The incidence table of lines/contours and points.

|    | P1 | P2 | ... | Pk |
|----|----|----|-----|----|
| L1 | 1  | 0  | ... | 0  |
| .  | .  | .  | .   | .  |
| .  | .  | .  | .   | .  |
| .  | .  | .  | .   | .  |
| Lm | 0  | 0  | ... | 1  |

Merge_Points( ) and Merge_Lines( ) are the procedures to eliminate duplicated features resulting from potentially noisy input data (e.g., the reflections around a sharp edge). Merge_Points( ) scans through the set of corners. The Euclidean distance between pairs of neighboring corners is evaluated. If its value is less than a preset threshold (normally the distance threshold is about 2–3 pixels in length), the two points are merged into one. Merge_Lines( ) scans through the set of lines and contours. If two lines or contours are close to each other and the angle between them is very close to 0 or π, they are merged into one. According to the merging result, the incidence table is adjusted. Then the faces are extracted by procedure Extract_Faces( ). Each face is represented by:

1. a set of lines or contours to form the face boundary;
2. a set of points;
3. a vector signifies the normal direction of the face.

The incidence matrix shown in Table 1 is actually a presentation of a connected graph. Each face of the object corresponds to a closed circuit. Searching for a closed cycle in a graph is a common task in linear graph theory. Here a depth-first search algorithm is applied. Different from the conventional cycle searching algorithm, in the face searching, there is an constraint to judge if a cycle consists of a face or not; in the cycle, all features have to be approximately on the same plane. The search algorithm begins with a set of three connected corners, from which an approximated normal vector of the possible face can be calculated. During the expansion of the cycle, this normal vector is consistently updated according to the new topological features added. The face grouping procedure includes the following steps:

1. set the face set Sf empty;
2. find all ordered lists of 3 corners in which the 3 corners are connected consequently by 2 edges, denoted as the list $L_i=\{ci1, ci2, ci3\}$ with corners ci1, ci2 and ci3, where $1 \leq i1, i2, i3 \leq n$, n is the total number of corners, $1 \leq i \leq k$ is the index of the list, and k is the total number of 3-corner lists;
3. let i=1;
4. for each list $L_i$, calculate the normal vector of the plane defined by all the corner points in the list, denoted as ni;
5. if the tail of $L_i$ is connected to its head, then list $L_i$ represents a face; put $L_i$ in Sf, and go to step 8;
6. if there exists a corner cj in the corner set that satisfies:
   cj is not in $L_i$ yet;
   cj connects the current tail of $L_i$;
   cj is approximately in the plane defined by all the corners in $L_i$; then put cj in $L_i$ as the new tail; if no corner satisfies the above conditions, go to step 8;
7. go to step 4;
8. let i=i+1, then if i≦k then go to step 4;
9. output Sf and exit.

Finally, procedure Group_Faces( ) groups the faces together if they have one or more common edges and their normal vector are collinear/parallel.

Building a triangular mesh is straightforward from the face model. The faces are first converted into the forms of polygons or polygonalized circles. The following recursive procedure decomposes a polygon P0 with n edges and n corners into n−2 triangles:

1. set the triangle list T empty, let m=n;
2. let j=1;
3. in polygon $P_j$, start from any point, label the corners from 1 to m consequently, denoted as c1, c2, . . . , cm, where m is the number of corners in polygon $P_j$;
4. let i=1;
5. add an edge from corner i to corner i+2 to make up a new triangle t={ci, ci+1, ci+2}, and add t to T (if i+2=m+1, then use c1 as ci+2);
6. let i=i+2;
7. if i<m, go to step 5;
8. use the nodes c1, c3, . . . , c2k+1 , and the newly added edges to construct a new polygon $P_{j+1}$ with reduced numbers of corners and edges;
9. if $P_{j+1}$ is a triangle, then add $P_{j+1}$ to T, output T and exit;
10. let j=j+1, go to step 2.

Figure 10:
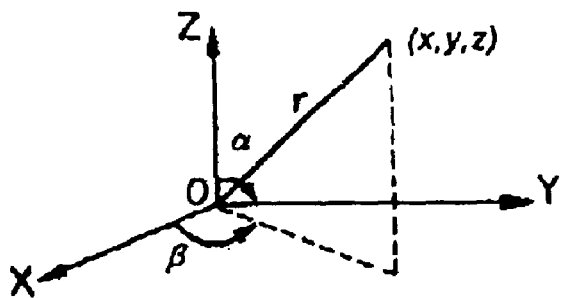
FIG. 10 graphically illustrates the relationship of spherical coordinates and Cartesian coordinates for a three dimensional point.

Since the triangles generated by the above processes are directly from the face models, they automatically satisfy the conditions required for a triangular mesh. If the topological features extracted from the imaging data are dense, then triangular meshes can be generated using an improved version of the well-known Delaunay triangulation method given by R. E. Fayek and A. K. Wong ("Triangular Mesh Model for Natural Terrain", *Processings on SPIE: Intelligent Robots and Computer Vision*, October 1994). However, to apply such method, a transformation of the features is required since Delaunay triangulation only works on data that lay approximately on the same plane. The topological features of an object are transformed from the conventional Cartesian coordinate system, where location is defined by (x, y, z), into a spherical coordinate system centered within the object, where location is defined by (α, β, r) (refer to FIG. 10). The entire process of applying Delaunay triangulation is:

1. compute a spherical coordinate system for the three dimensional object to be modeled;
   1) compute the geometrical center $P_c=(X_c, Y_c, Z_c)$ from the coordinates of the points extracted from the image:

$$X_c=(X\max+X\min)/2.0,\ Y_c=(Y\max+Y\min)/2.0,\ Z_c=(Z\max+Z\min)/2.0$$

where Xmax, Ymax, Zmax, Xmin, Ymin and Zmin give the range of the object occupies in the space expressed in Cartesian coordinate system.

2) compute the center of gravity Pg=(Xg, Yg, Zg) of all topological features:

$$Xg=(\Sigma X_i)/n,\ Yg=(\Sigma Y_i)/n,\ Zg=(\Sigma Z_i)/n$$

where n is the total number of feature points and ($X_i$, $Y_i$, $Z_i$) is the coordinate of $i^{th}$ point expressed in Cartesian coordinate system.

3) compute the major axis, which is given by vector Va=(Pc, Pg);
4) compute a minor axis, which is given by vector Vm, where Vm is:

$$Vi=Va \times (P_c, P_k),$$

where × signifies the cross product, and $P_k$ is the feature point that has the largest distance to vector Va.

5) construct the spherical coordinate system, such that Pg is the center, Va is the direction of α=0, Vi is the direction of β=0, r is the distance to the center.

2. transform the coordinates of said face model from the conventional three dimensional Cartesian coordinate system to said spherical coordinate system: for transformed point (α, β, r), its relation to (x, y, z) satisfies:

$$x=r \sin \alpha \cos \beta,\ y=r \sin \alpha \sin \beta,\ z=r \cos \beta$$

3. apply Delaunay triangulation using r=0 as its reference plan, that is, performing the triangulation on (α, β), while using r as the reference feature.

4. transform the resulting triangular meshes from spherical coordinate system to conventional Cartesian coordinate system.

After a set of triangular meshes are obtained, they can be directly mapped to the representative attributed graph (RAG) according to the procedures given in Definition 10. Hyperedges are then induced from the elementary graph in hypergraph, which is a dual of RAG. Different from an edge in an attributed graph, a hyperedge in an attributed hypergraph represents the n-ary relation among a number of (at least two) vertices, groups of vertices or other hyperedges in the attributed hypergraph. In this invention, the hyperedges are induced from the triangles in the RAG. The steps are:

1. select at least a type of attribute used for hyperedge inducing (for object modeling, typical feature types are surface adjacency, orientation, color and texture);
2. select the value bins $B_i$=[bi1, bi2), i=1, 2, . . . k, of the attribute values for the selected attribute type(s), where k is the total number of bins;
3. group all attributed vertices into groups, such that all attributed vertices in the same group and connected and have attributed values fall into the threshold:
   1) set the group list G empty, let n=0;
   2) let n=n+1, j=0;
   3) find a triangle T in the RAG that is not in any group in G={$G_1, G_2, \ldots G_{n-1}$}, if all triangles have been put into G, then exit;
   4) compute attribute value b of T. find the bin $B_i$ such that b∈$B_i$, and put T in $G_n$, let j=1;
   5) if a triangle T in the RAG is adjacent to any triangles in Gn, compute its attribute value b', if b'∈$B_i$, then add T' into $G_n$, and let j=j+1;
   6) repeat step 4) until there is no T' found that satisfies the condition to be put into $G_n$;
   7) go to step 2).
4. compute an attribute value by computing the average attributed for all triangles in the group and assigned it as the attribute of the group;
5. assign an attributed hyperedge for each group.

Figure 7:
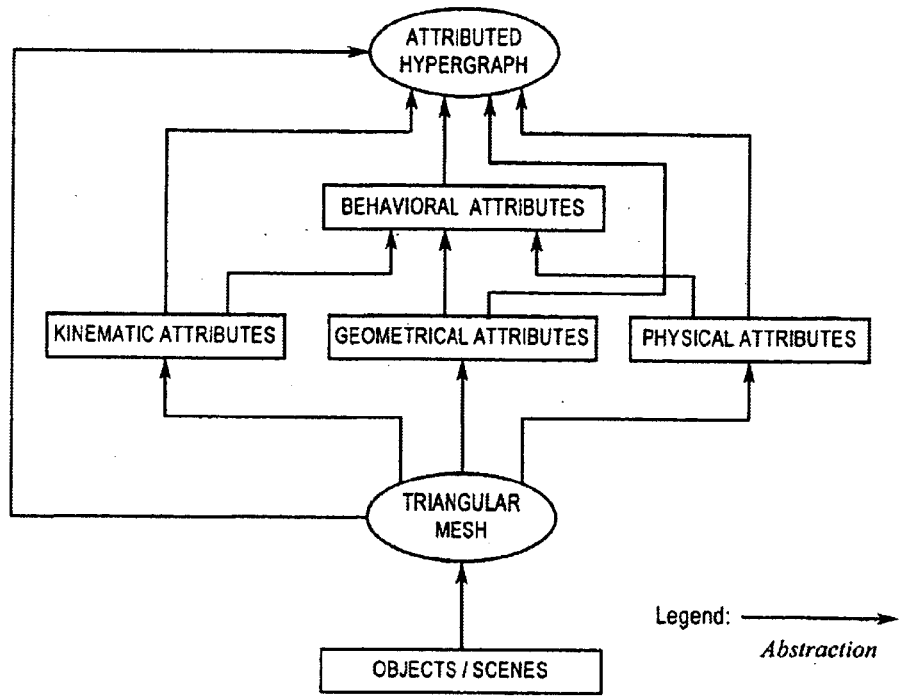
FIG. 7 shows the geometrical, physical and behavioral attributes and their relations in AHR.

The hyperedge grouping criteria depend on the types of attributes selected for the hyperedges. Such attributes can be kinematic attributes, geometrical attributes, physical attributes, and/or behavioral attributes. FIG. 7 shows the levels of abstraction and their relations with triangular mesh and attributed hypergraph.

In a typical application, there will be more image views. For example, for a complete camera-based 3D object model, at least four views are preferably taken, one for the front, one for the back, and two for the left and the right sides of the object. For each view, following the procedure of attributed hypergraph construction given above, we can obtain one attributed hypergraph. Therefore, a method to synthesize all these attributed hypergraphs is required to compute a complete attributed hypergraph representation (AHR) of the object. The procedure comprises the following steps:

1. determine the overlapping region of all available attributed hypergraphs $H_1, H_2, \ldots H_k$, where k is the number of attributed hypergraphs:
   1) transform the coordinates of points in the form of (x, y, z) that correspond to the vertices in the hypergraphs to points in spherical coordinate system in the form of (α, β, r) as described before;
   2) for all point (α, β, r), let x'=α, y'=β and z'=r;
   3) project (x', y', z') to the plane z'=0;
   4) determine the overlapping regions $O_1, O_2, \ldots O_m$, and non-overlapping regions $O_{m+1}, O_{m+2}, \ldots O_{m+n}$, by examining all projected points.
2. in each overlapped region $O_i$, 1≦I≦m+n, using all the points, re-compute a triangular mesh $T_i$ by Delaunay triangulation method as described before;
3. for triangular mesh $T_i$, mapping the re-computed triangular meshes to a new RAG $R_i$;
4. form a new attributed hypergraph $H'_i$ from each $T_i$
5. integrate all the attributed hypergraphs in a new integrated attributed hypergraph H by applying the union operater "∪" given by Definition 12:

$$H=H'_1 \cup H'_2 \cup H'_m \cup H'_{m+1} \cup H'_{m+2} \cup \ldots \cup H'_{m+n}$$

6. apply the hyperedge inducing method described above to compute attributed hyperedges for the new integrated attributed hypergraph H;
7. associate the newly computed attributed hyperedge with H to form an attributed hypergraph representation (AHR).

During the synthesis process described above, a more complete AHR is constructed. The possible redundant information in the input AHR's obtained from different views enables one to perform the following improvements on the recovered 3D data:

Compensate for system errors:
  System errors are brought in by the digitization error, feature detection error and computation error etc. The errors can be compensated by the averaging effect in the synthesis.

Recover missing features:
  Occlusions, unrealistic illuminations, or errors in feature detection can cause missing object parts in one view. However, the missing parts still have a good chance of being present in other views.

Eliminate erroneous features:
  The noises on the object's surfaces and in the background may form erroneous features. In AHR synthesis, a score representing the number of appearances for each feature can be added. Since the noise has very little chance of being repeated at the same place every time, it will have a very low score. At the final stage, features with low scores can be eliminated.

The same model construction concept can be easily applied to 2D objects. If the topological features extracted for AHR construction are in 2D domain instead of 3D domain, we can easily construct the AHR in the same way.

B. Intelligent 3D Model Transformation

One of the most important applications of attributed hypergraph representation (AHR) based object modeling is automatic transformation of 3D objects. A general transformation is basically the metamorphosis of an object from one state (the source) to another (the target) via continuous transitions (morphing). AHR provides an ideal tool for 3D transformation on object's shapes, colors, textures and many other properties. Given two AHR's representing the two states of an object, a set of operators defined for attributed hypergraph can be extracted. Moreover, a sequence of intermediate 3D objects under continuous deformation or transformation can be reconstructed via the construction of the intermediate AHR's.

When two states of the same object are represented by AHR's, the transformation corresponds to a sequence of operations applied on the source AHR such that it finally changes itself into an AHR that is isomorphic to the target AHR. The AHR-based transformation disclosed herein is able to:

1. Automatically determine a transformation path between two objects; and
2. Justify the qualitative and the quantitative changes in the transformation.

To produce the metamorphosis of an object from one state to another one, there may exist many paths. There are usually certain constraints controlling the transformation thus making one path more preferable than others. The volume preserving and the surface preserving constraints are the popular ones in many applications. These methods usually use Minkowski sums or a merged topology to control the time-varying object. An AHR-based transformation is different in that it uses feature preserving constraints.

In an AHR-based transformation, given the initial AHR $G_1$ and the final AHR $G_2$, an optimal subgraph isomorphism algorithm first finds the optimal common sub-hypergraph of the two AHR's. Since the distance measure applied in the optimal subgraph isomorphism algorithm is confined by the type of selected features, the transformation path generated follows the path with the minimal cost subject to the feature type. In other words, the algorithm attempts to find the path that minimizes the cost of subgraph isomorphism associated with the selected feature type. Thus, it is called feature preserving transformation.

The operator sequence that performs the transformations between the two AHR's can be similarly determined. The operator extraction begins with the global motion parameters rotation matrix R and translation vector T from all the matched elements of the two AHR's, which are vertices, edges or hyperedges. The least squares method used in estimating R and T minimizes the total displacement for the matched elements. Since there are only quantitative changes for those matched ones, the qualitative information associated with them is well preserved. Meanwhile, the optimal subgraph isomorphism algorithm minimizes the number of unmatched elements since they will introduce penalties that have the highest cost in matching. Hence, during the process of deforming $G_1$ into $G_2$ by applying the operator sequence, the qualitative features in the source AHR are maximally preserved.

If the two AHR's used for transformation are constructed through the procedures described in Section A above, they should have four layers each, one for root, one for hyperedges, one for edges and one for vertices. If one or both have more than one layer of hyperedges, these layers have to be combined into one using the hyperedge join operator given by Definition 17. The procedures of AHR-based object transformation are.

1 let i=1;
2. for same $i^{th}$ layer of the two AHR's $G_1$ and $G_2$, by the definition of attributed hypergraph (Definition 8 and the description following that, as well as FIG. 4), the layers themselves are two attributed graphs respectively; label them as $G_1$, and $G_2$; respectively;
3. for each pair $G_{1i}$ and $G_{2i}$, compute the optimal subgraph isomorphism $S_i$ for attributed graph as given by A. K. C. Wong, M. L. You and S. C. Chan ("An Algorithm for Graph Optimal Monomorphism", *IEEE Transctions* on S. M. C. Vol. 20(3), pp. 628–636, 1990); the distance associated with Si is denoted as di;
4. if i<4, let i=i+1, and go to step 2;
5. sum up di for I=1, 2, 3, 4, and let a sequence $S=(S_1, S_2, S_3, S_4)$ as the optimal subgraph isomorphism for attributed hypergraph;
6. compute the transformation operators corresponding to matched graph elements (attributed vertices, attributed edges or attributed hyperedges) from S:
   1) from S, find all the matched graph elements in the form a common attributed subgraph g;
   2) compute the estimated rotation matrix R and the translation T from the displacements of all matched elements; Theoretically, three matched pairs of elements are enough to recover R and T since R and T only have six degree of freedom plus a scaling (zooming) factor; however, it is desired to have more than four pairs and use a least squares method to insure the best estimation;
   3) back project the calculated R and T to the elements in the initial graph to obtain their computed displacement;
   4) convert each element's displacement into an attribute transition operator according to Definition 18;
7. compute the transformation operators corresponding to unmatched graph elements from S:
   1) traverse all elements in g computed in step 6-1) and search for unmatched ones that are adjacent to at least one element in g;
   2) if an unmatched node $n_u$ is adjacent to node $n_g$ in g while nu is in $G_2$, then
      a) apply operator subdivision or dichotomy to $n_g$ to yield two new elements n1 and n2;
      b) apply two attributed transition operators to n1 and n2 respectively to transform n1's attribute value to $n_g$'s, and n2 to $n_u$'s
   3) if an unmatched node $n_u$ is adjacent to node $n_g$ in g while nu is in $G_1$, then
      a) apply operator join or merge to ng and nu to yield one new element $n_p$;
      b) apply an attributed transition operator to $n_p$ to tranform $n_p$'s attribute value to $n_g$'s;
   4) go to step 1) with updated (operators have been applied) $G_1$, $G_2$, and g until there is unmatched element;
8. enlisting all said transformation operators into a sequence applied and eliminate the ones that cancel each other.

With the sequence of operators extracted, the transformation path is well defined by applying the operators one by one. The automatic transformation frame generation is based on the definition of distance between attributed hypergraphs given by A. K. C. Wong, M. L. You and S. C. Chan ("An Algorithm for Graph Optimal Monomorphism", *IEEE Transctions* on S. M. C. Vol. 20(3), pp. 628–636, 1990). If $d(G_1, G_2)$ is the distance between two AHR's $G_1$ and $G_2$, we can use linear interpolation to generate continuous frames between $G_1$ and $G_2$. Suppose that in the transformation, the total time from pattern G1 to G2 is T. Given any time t such that $0 \leq t \leq T$, the corresponding transformed AHR at t, denoted as G(t) can be expressed as:

$$G(t) = G_1 + [(t/T) \cdot (G_2 - G_1)] \quad (1)$$

Where $G_2 - G_1$ signifies the difference between $G_1$ and $G_2$ measured by the AH operator set, and "·" means using its left-hand-side as the arithmetic operator to quantify its right-hand-side operator set.

The connotation of Equation (1) is that G(t) can be built by applying a proper set of AH operators that varies with t. Suppose that the set of operators to transform $G_1$ to $G_2$ is $Op = \{op1, op2, \ldots, op_n\}$, where $opi (1 \leq i \leq n)$ can be any one of the primary attributed hypergraph operators defined previously (Definitions 12 to 18), and the set of operators that transform $G_1$ to G(t) is expressed as $Op(t) = (op1(t), op2(t), \ldots, op_n(t))$. Referring to Equation (1), $op_i(t)$ is derived from opi by:

if $op_i$ is an attribute transition operator, $op_i(t)$ is also an attribute transition operator:

$$op_i(t) = (1 - t/T) opi \quad (2)$$

if $op_i$ is intersection, dichotomy or subdivision, then:

$$op_i(t) = op_i \text{ if } 0 < t \leq T$$
$$op_i(t) = Iop \text{ otherwise} \quad (3)$$

where Iop denotes the identity operator that does not change the input AHR; if opi is accompanied by an attribute transition operator fa–$op_i$, then:

$$fa\text{–}op_i(t) = (1 - t/T) fa\text{–}op_i \quad (4)$$

if opi is union, merge or join, then;

$$op_i(t) = Iop \text{ if } 0 \leq t < T$$
$$op_i(t) = op_i \text{ otherwise} \quad (5)$$

where Iop denotes the identity operator that does not change anything; if opi is accompanied by an attribute transition operator fa–opi, we have:

$$fa\text{–}op_i(t) = (1 - t/T) fa\text{–}op_i \quad (6)$$

FIG. 9 gives two examples of continuous transformations on simple graphs with qualitative transition operators applied.

C. Augemented Reality by Intelligent 3D Model Manipulation

This invention provides an efficient and practical methodology for vision-based object modeling (Section A) and transformation (Section B) which has broad applications in computer vision, graphics and virtual reality. One useful application is to create augmented reality (AR) by Intelligent model manipulation.

Augmented reality is a technology that first employs computer vision methodologies to estimate the 3D geometry of real world scenes, and then facilitates computer graphics technologies to augment the synthesized models and to present them in a way similar to that of virtual reality (VR).

To build an augmented scene, virtual objects/scenes have to be combined with the real objects/scenes constructed by the process described in Section A. With this invention, imaging data from the real world can be sensed and modeled by AHR. Similarly, virtual scenes are also modeled by AHR. The AHR's from both the real scene and the virtual scene are then integrated into a unified AHR, which represents the augmented scenes.

Figure 12:
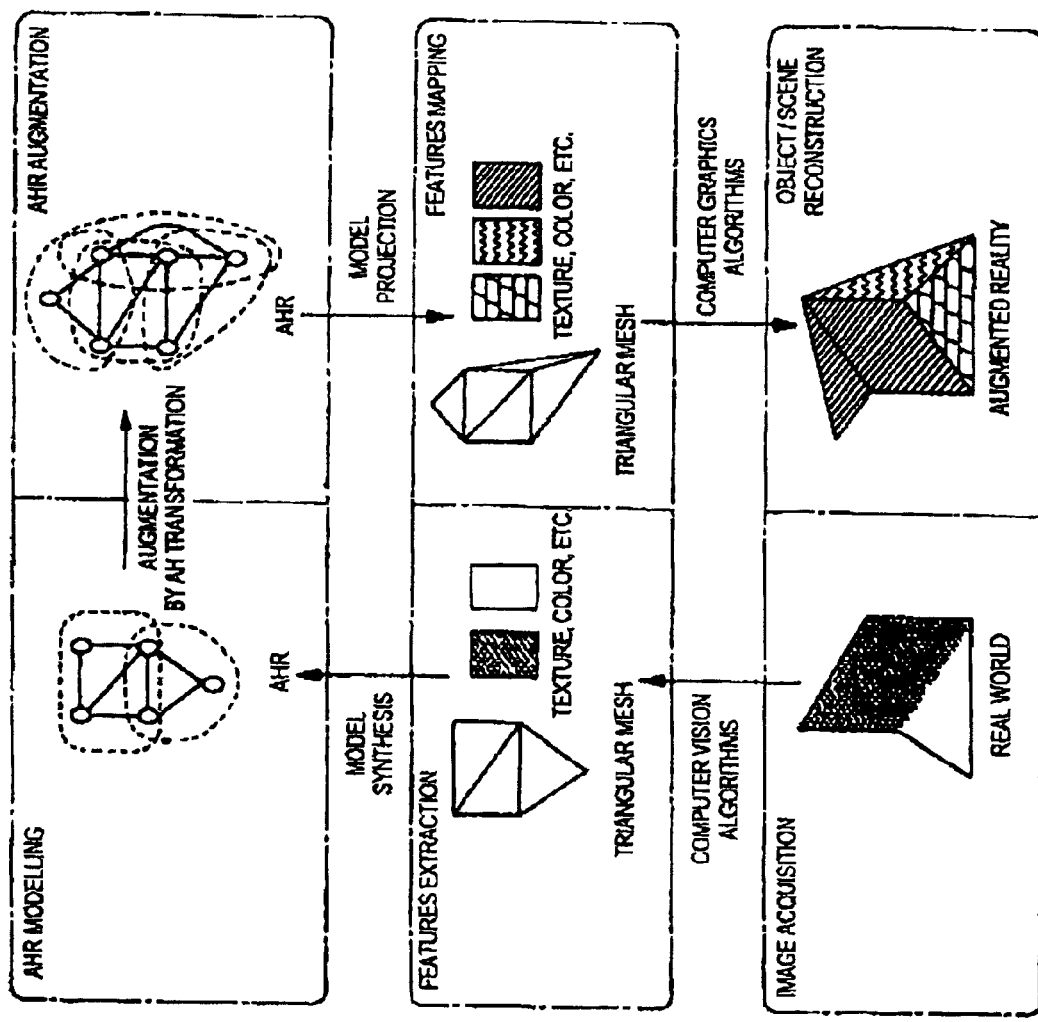
FIG. 12 illustrates the process of AHR-based augmented reality construction.

The term augmentation used herein means not only integrating different AHR's, but also supplementing the AHR's with elements that may appear neither in the real scenes nor in the virtual scenes. With AHR, object properties such as surface colors and textures are represented as attributes, which makes it easy for us to perform the integrating and supplementing tasks required by most AR applications. FIG. 12 gives a simple illustration on how AHR can be applied in the construction of augmented reality.

The procedure of constructing augmented reality from a real scene and a virtual scene is:

1. constructing the AHR of the real scene using the method given by Section A;
2. constructing the AHR of the virtual scene using a computer graphics tool;
3. computing the sequence of transformation operators between said two attributed hypergraphs using the method given in Section B;
4. integrating the two AHR's corresponding to the real scene and the virtual scene respectively into a unified AHR that represents the augmented scene by applying the sequence of transformation operators computed in step 3; and
5. reconstructing the augmented scene from the AHR obtained in step 4.

The core of this procedure is performing the augmentation by AHR integration (step 4), which is achieved by applying a proper set of AH operators.

Typical Augmentations Include:

Integration with virtual scene:
  A typical AR world normally consists of the objects constructed from the real 3D scene and additional objects or backgrounds imported from the virtual world. One of the most important problems in the integration procedure is the proper alignment of the virtual parts and the real parts.

Change of surface colors and/or textures:
  The objects in the AR world may change their surface colors and/or textures to present certain effects (for example, the shadow and the color changes due to the virtual light sources);

Shape changes by deformations:
  When the AR world is presented for physical simulation, it is possible that the objects, either from real views or from a virtual world, have shape changes due to the physical interactions among them.

In Definition 12 and Definition 13, we have defined the operators $\cup$ (union) and $\cap$ (intersection) on two attributed hypergraphs, which can be directly applied for the task of AHR integration. Suppose that the AHR of the real scene is G and the AHR of the virtual part is $G_v$, the combined AHR G is obtained by:

1. calculate $G_u = G_r \cup G_v$ and $G_i = G_r \cap G_v$;
2. let $G_o = G_u \backslash G_i$;
3. align the attributes of all entities in $G_i$;
4. set $G = G_o \cup G_i$.

The alignment of the attributes of two AHR's depends upon the application context. Normally, it only involves translations and/or rotations on the AHFR's to properly position the objects in the AR scene and thus is handled by one or more attribute transitions. However, in some cases, there may be qualitative changes of the AHR's associated with the integration. In the task of object fusion which may be required by AR tasks, the integration of the two AHR's that represent the two objects, denoted as $G_r$ and $G_v$, has to be followed by eliminating all redundancies (e.g., inner surfaces or inner vertices) to ensure a fully integrated shape. The following steps will remove the inner vertices and surfaces:

1. calculate G which is the integration of $G_r$ and $G_v$ (with possible inner vertices and/or surfaces), and $G_i = G_r \cap G_v$;
2. if a vertex $vk \in G_i$, vk is an inner vertex;
   (a) find a vertex $vi \in G$ such that vi is adjacent to vk and the discrepancy between vl's attribute value $A_{vl}$ to vk's attribute value $A_{vk}$ is the smallest among all vertices that are adjacent to vk;
   (b) in G, apply merge on vk and vl;
3. if a hyperedge $H_k \in G_i$, $H_k$ becomes an inner hyperedge:
   a) find a hyperedge $H_l \in G$ such that $H_l$ is adjacent to $H_k$ and the discrepancy between $H_l$'s attribute value $A_{el}$ to $H_k$'s attribute value $A_{ek}$ is the smallest among all hyperedges adjacent to $H_k$;
   b) in G, apply join on $H_k$ and $H_j$;
4. if there is no inner vertex or hyperedge, exit, otherwise go to step 2.

Another important procedure in performing the augmentation is object reconstruction from AHR. Since the AHR has the geometrical information stored on its elementary graph, which is constructed from the triangular mesh model through RAG's, the reconstruction of the object shape resembles the reconstruction of an object's shape by triangular mesh approximations. Other properties of the object, such as surface color and texture can be extracted from the attributes associated with the AHR and applied to the reconstructed triangular mesh.

Natural looking surface textures (or surface colors when texture is not considered) are of great importance to the construction of augmented reality. To meet this requirement, a texture or color or color binding algorithm is adopted to estimate the surface appearance for each triangle from the available image views.

Figure 13:
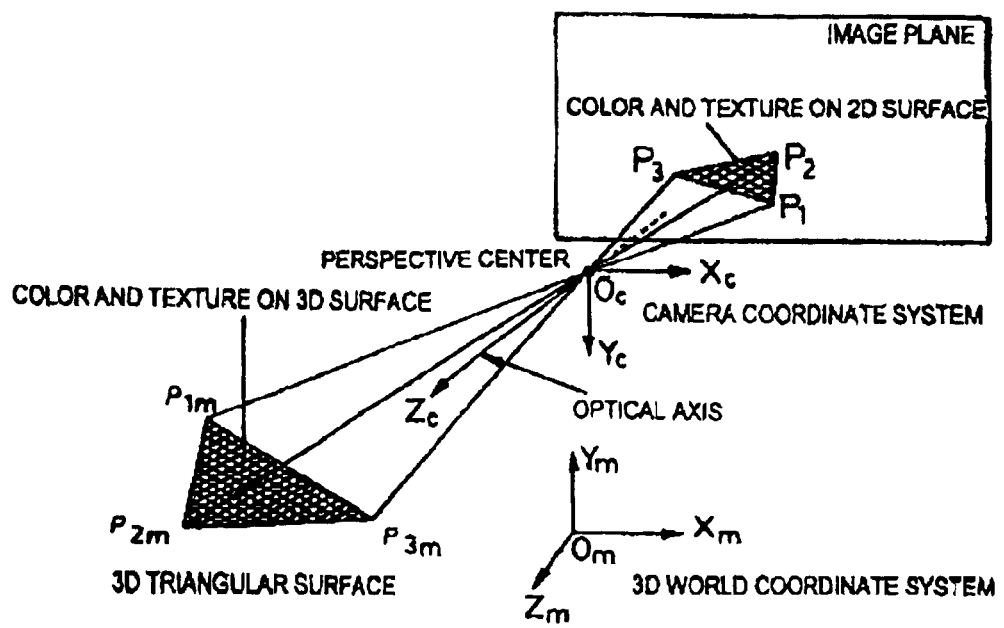
FIG. 13 illustrates the principle of texture inversion from 2D image to 3D surface.

FIG. 13 illustrates the principle of binding surface appearance information. With calibrated camera parameters, the projective relation between the 3D so shape and their image views can be established in the form of a set of equations. Then for each triangular surface in the reconstructed model, the image view with the largest viewing area of the triangle is selected. The texture and/or color of the projected triangle in the selected image view is inverted into 3D modeling space and clipped on the corresponding triangle. The surface texture (or color) binding algorithm has the following modules:

1. Texture (or color) region grouping:
   Since the object is represented by an AHR-based on triangular mesh, smoothly connected triangles with homogeneous textures (or colors) in their image views are grouped together to reduce the computational cost. Local geometrical features are also considered as constraints to make sure that the triangles in the same texture (color) group are smoothly connected. A closed convex region that has invariant normal vector is preferred for binding to reduce the total length of boundary.
2. Image projection selection:
   In most cases, a grouped region is visible in more than one of the images. It is reasonable to assume that the greater the exposure of the texture region in an image, the more accuracy will be achieved when the region is inverted into a model space. Therefore, the image with the largest viewing area of the grouped texture region is selected and a projective inversion is performed with the camera (or any other sensor used for capturing the images) pose associated with this image.
3. Boundary processing:
   Special care has to be taken along the boundaries between different texture regions. A simple averaging filter is added for the local areas around the boundaries to blend the texture. Although this results in a local blurring effect, it is more visually acceptable than the abrupt change without the filter, which is called the blocking effect in computer graphics.
4. Texture synthesis for occluded region:
   It is possible that the available views do not cover all the surfaces of the object/scene. For color attributes, a simple duplication of the color from the nearby triangles is adequate. In the case that textures are processed, the texture of the invisible regions is synthesized from visible regions depending on the viewing point. The synthesized textures or duplicated colors may not correspond to the real ones but are still less conspicuous then the texture/color holes.

The problem of shape deformation arises when the objects/scenes are modeled in AHR with physical parameters as attribute values. Physical features as attributes in AHR describe deformable objects by (1) the physical properties of the objects; (2) the physical state transitions; (3) the initial states; and (4) external factors such as the external forces.

In an augmented scene, the augmentation may include the changes of the physical states for the existing objects or the virtual objects, and possibly with additional external forces. In the above cases, due to the physical interactions among the objects, there may be deformations. Therefore, a recalculation on the physical states of the objects is required. Further detail of the calculations on shape deformations by AHR operators has been given in Section B.

D. 3D Web Streaming Based on AHR

Referring again to FIG. 1, the AHR method disclosed herein provides not only practical modeling and transformation methods but also an efficient data compression method for 3D data. A typical application of such data compression is 3D Web content streaming. AHR-based 3D Web streaming methodology utilizes the method given in Section A to model 3D Web content. It transmits the symbolic representation of the Web content instead of the Web content itself. Hence, it significantly improves the speed of content transmission over the Internet with limited bandwidth. The procedure of 3D Web streaming is:

1. at the server side, given a piece of dynamic 3D Web content, extract the features and represent by AHR $G_s$;
2. construct the AHR Gd corresponding to the dynamic portion of the Web content;
3. extract the AHR operator sequence $OP_d$ as directed in Section B by comparing $G_d$ with its corresponding portion in $G_s$;
4. transmit the AHR operator sequence $OP_d$ over the Internet;
5. at the client side (on a client computer), given the AHR $G_s$ and its corresponding operator sequence OPd, apply the operators to the AHR and generate a sequence AHR's, which represent the dynamic Web content;
6. perform object reconstruction for each of the AHR to form the dynamic Web content.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A computerized method of modeling a three dimensional object, comprising:

extracting selected topological features from captured imaging data or other surface data of a three dimensional object;

constructing a triangular mesh representation of said three dimensional object from said topological features, the triangular mesh representation including vertices and edges;

mapping each vertex in said triangular mesh to a corresponding vertex in a graph, mapping each edge in said triangular mesh to a corresponding edge in said graph, computing features of said triangular mesh, mapping said features of said triangular mesh to attributes associated with said graph to construct a representative attributed graph; and constructing an attributed hypergraph representation from said representative attributed graph.

2. A computerized method according to claim 1 wherein the step of constructing a triangular mesh representation includes:

computing a set of faces from said topological features, each face being bounded by a closed circuit;

constructing a face model which models the surface of said three dimensional object from said set of faces; and converting said face model into said triangular mesh by triangularizing each of said faces.

3. A computerized method according to claim 1 wherein the step of constructing a triangular mesh representation includes:

constructing a spherical coordinate system for said topological features;

transforming coordinates of said topological features from a conventional three dimensional Cartesian coordinate system to said spherical coordinate system;

applying Delaunay triangulation of said transformed topological features to construct said triangular mesh in said spherical coordinate system; and transforming said computed triangular meshes from said spherical coordinate system to said conventional Cartesian coordinate system.

4. The computerized method according to claim 3 wherein said step of computing the optimal spherical coordinate system for said topological features includes:

computing a geometrical center of all the coordinates of said topological features;

computing a center of gravity of all the coordinates of said topological features;

computing a major axis and a minor axis from said geometrical center and said center of gravity; and constructing the spherical coordinate system using said geometrical center, said center of gravity, and said major axis and said minor axis.

5. The computerized method according to claim 1 wherein said step of constructing an attributed hypergraph representation from said representative attributed graphs includes:

mapping each attributed vertex of each of said representative attributed graphs to an elementary node of an attributed hypergraph;

mapping each attributed edge of each of said representative attributed graphs to an elementary edge of said attributed hypergraph;

inducing attributed hyperedges of said attributed hypergraph; and constructing an attributed hypergraph representation from all said attributed hypergraphs, each of which is from a representative attributed graph.

6. The computerized method according to claim 5 wherein the step of inducing the attributed hyperedges of said attributed hypergraph includes:

selecting at least one type of attribute;

selecting value bins for said at least one type of attribute;

grouping all attributed vertices into groups, such that all attributed vertices in a given group are connected, and have attributed values falling into the same value bin;

assigning a hyperedge to each group; and computing a value for said selected at least one attribute type for each hyperedge.

7. The computerized method according to claim 5 wherein constructing an attributed hypergraph representation from all said attributed hypergraphs includes:

determining the overlapping regions of all said attributed hypergraphs;

re-computing vertices and edges within said overlapping regions;

integrating the non-overlapping regions and said overlapping regions into one attributed hypergraph; and re-computing the attributed hyperedges of said integrated attributed hypergraph to construct the attributed hypergraph representation.

8. The method according to claim 1 wherein said selected topological features include points, lines and contours.

9. The method according to claim 1 wherein said step of extracting selected topological features from captured imaging data includes providing digitized captured imaging data of said of three dimensional object and extracting therefrom said selected topological features.

10. The computerized method according to claim 1 wherein said captured imaging data is acquired from a machine vision apparatus that includes means for digitizing said imaging data.

11. The computerized method according to claim 10 wherein said machine vision apparatus includes at least one laser range sensor or at least one charge coupled device (CCD) camera.

12. The computerized method according to claim 1 including a step of storing said attributed hypergraph representation in a storage means accessible by a computer.

13. The computerized method according to claim 12 including a step of performing object reconstruction for each attributed hypergraph and displaying said reconstructed object on a computer.

14. The computerized method according to claim 1 wherein said three dimensional object is a scene comprising a plurality of objects.

15. A computerized method of intelligent model transformation, comprising the steps of:

computing an optimal subgraph isomorphism for attributed hypergraph between a source attributed hypergraph and a target attributed hypergraph, wherein said source attributed hypergraph is to be transformed into said target attributed hypergraph;

computing a sequence of transformation operators from said optimal subgraph isomorphism for attributed hypergraph;

computing a transformation path from said sequence of transformation operators; and generating a sequence of attributed hypergraphs along said transformation path from said sequence of transformation operators.

16. The computerized method according to claim 15 wherein said step of computing the optimal subgraph isomorphism for attributed hypergraph includes:

segmenting said source attributed hypergraph and said target attributed hypergraph into the same number of layers;

for each of said layers, constructing a source attributed graph from said source attributed hypergraph, and a target attributed graph from said target attributed hypergraph;

for each pair of said source attributed graph and said target attributed graph, computing an optimal subgraph isomorphism for attributed graph; and computing said optimal subgraph isomorphism for attributed hypergraph from all said optimal subgraph isomorphism for attributed graph for each layer.

17. The computerized method according to claim 16 wherein computing said optimal subgraph isomorphism for attributed graph between the source attributed graph and the target attributed graph includes:

building a search tree for the subgraph isomorphism between said source attributed graph and said target attributed graph;

defining a heuristic cost function of said subgraph isomorphism for attributed graph in said search tree; and applying an A* heuristic search algorithm with said heuristic cost function to find said optimal subgraph isomorphsim for attributed graph.

18. The computerized method according to claim 15 wherein the step of computing said sequence of transformation operators includes:

finding all unmatched attributed vertices, attributed edges or attributed hyperedges from said optimal subgraph isomorphism for attributed hypergraph;

computing the transformation operators from said unmatched attributed vertices, attributed edges or attributed hyperedges;

finding all matched pairs of attributed vertices, attributed edges or attributed hyperedges from said optimal subgraph isomorphism for attributed hypergraphs;

computing the transformation operators from said matched pairs of attributed vertices, attributed edges or attributed hyperedges; and organizing all said transformation operators into a sequence.

19. The computerized method according to claim 16 including a step of storing said sequence of transformation operators and said sequence of attributed hypergraphs representations in a storage means accessible by a computer.

20. The computerized method according to claim 19 including a step of performing object reconstruction for each attributed hypergraph and displaying said reconstructed object on a computer.

21. The computerized method according to claim 19 including a step of transmitting said sequence of transformation operators and said sequence of attributed hypergraphs representations from a first computer at a server site to a second computer at a client site and performing object reconstruction for each attributed hypergraph sequence and displaying a reconstructed object sequence on said second computer.

22. A computerized method of intelligent model augmentation of a real scene with a virtual scene into an augmented scene, comprising the steps of:

constructing an attributed hypergraph representation of said real scene;

constructing an attributed hypergraph representation of said virtual scene;

computing a sequence of transformation operators between said two attributed hypergraphs;

integrating said two attributed hypergraph representations into a unified attributed hypergraph representation using said sequence of transformation operators;

constructing in augmented scene from said unified attributed hypergraph representation.

23. The computerized method according to claim 22 wherein the step of integrating said two attributed hypergraph representations into a unified attributed hypergraph representation includes:

integrating attributed vertices of said two attributed hypergraph representations;

re-computing attributes for said integrated attributed vertices;

integrating attributed hyperedges of said two attributed hypergraph representations; and computing attributes for said integrated attributed hyperedges.

24. The computerized method according to claim 23 including a step of storing said augmented scene in a storage means accessible by a computer.

25. The computerized method according to claim 24 including a step of performing object reconstruction for each attributed hypergraph and displaying said reconstructed object on a computer.

26. A computerized method of modeling and transforming and a three dimensional object, comprising:

extracting selected topological features from captured imaging data or other surface data of a three dimensional object;

constructing a triangular mesh representation of said three dimensional object from said topological features, the triangular mesh representation including vertices and edges;

mapping each vertex in said triangular mesh to a corresponding vertex in a graph, mapping each edge in said triangular mesh to a corresponding edge in said graph, computing features of said triangular mesh, mapping said features of said triangular mesh to attributes associated with said graph to construct a representative attributed graph;

constructing a source attributed hypergraph representation from said representative attributed graph;

computing an optimal subgraph isomorphism for attributed hypergraph between said source attributed hypergraph and a target attributed hypergraph, wherein said source attributed hypergraph is to be transformed into said target attributed hypergraph;

computing a sequence of transformation operators from said optimal subgraph isomorphism for attributed hypergraph;

computing a transformation path from said sequence of transformation operators; and generating a sequence of attributed hypergraphs along said transformation path from said sequence of transformation operators.

27. A computerized method according to claim 26 wherein said three dimensional object is a real scene, including a step of augmentation of said real scene with a virtual scene into an augmented scene, comprising the steps of:

constructing an attributed hypergraph representation of said real scene;

constructing an attributed hypergraph representation of said virtual scene;

computing a sequence of transformation operators between said source attributed hypergraph representation of said real scene and said attributed hypergraph representation of said virtual scene;

integrating said two attributed hypergraph representations into a unified attributed hypergraph representation using said sequence of transformation operators;

constructing an augmented scene from said unified attributed hypergraph representation.

28. The computerized method according to claim 27 including a step of storing said augmented scene in a storage means accessible by a computer.

29. The computerized method according to claim 27 including a step of performing scene reconstruction for said unified attributed hypergraph representation and displaying said reconstructed scene on a computer.

30. A method of modeling, transforming and manipulating objects according to claim 28 wherein said object is a piece of dynamic web content, including transmitting said attributed hypergraph representation and said associated sequence of transformation operators of said piece of dynamic web content over said internet from a server computer to at least one client computer, applying said sequence of transformation operators to said attributed hypergraph representation to generate a sequence of attributed hypergraphs representative of said dynamic web content on said client computer; and performing object reconstruction for each of said attributed hypergraphs to reproduce the piece of dynamic of web content on said client computer.

* * * * *